United States Patent
Lanting et al.

(10) Patent No.: US 10,552,755 B2
(45) Date of Patent: Feb. 4, 2020

(54) SYSTEMS AND METHODS FOR IMPROVING THE PERFORMANCE OF A QUANTUM PROCESSOR TO REDUCE INTRINSIC/CONTROL ERRORS

(71) Applicant: D-Wave Systems Inc., Burnaby (CA)

(72) Inventors: Trevor Michael Lanting, Vancouver (CA); Andrew King, Vancouver (CA)

(73) Assignee: D-WAVE SYSTEMS INC., Burnaby (CA)

( * ) Notice: Subject to any disclaimer, the term of this patent is extended or adjusted under 35 U.S.C. 154(b) by 700 days.

(21) Appl. No.: 14/829,342

(22) Filed: Aug. 18, 2015

(65) Prior Publication Data
US 2017/0017894 A1    Jan. 19, 2017

Related U.S. Application Data

(60) Provisional application No. 62/040,890, filed on Aug. 22, 2014.

(51) Int. Cl.
| | | |
|---|---|---|
| H01L 27/18 | (2006.01) | |
| G06N 10/00 | (2019.01) | |
| G06F 15/82 | (2006.01) | |

(52) U.S. Cl.
CPC ............ *G06N 10/00* (2019.01); *G06F 15/82* (2013.01)

(58) Field of Classification Search
CPC ..................................................... G06N 99/002
USPC ........................................................ 712/200
See application file for complete search history.

(56) References Cited

U.S. PATENT DOCUMENTS

| | | |
|---|---|---|
| 7,135,701 B2 | 11/2006 | Amin et al. |
| 7,307,275 B2 | 12/2007 | Lidar et al. |
| 7,418,283 B2 | 8/2008 | Amin |
| 7,533,068 B2 | 5/2009 | Maassen van den Brink et al. |
| 7,843,209 B2 | 11/2010 | Berkley |
| 7,876,248 B2 | 1/2011 | Berkley et al. |
| 8,008,942 B2 | 8/2011 | van den Brink et al. |
| 8,018,244 B2 | 9/2011 | Berkley |
| 8,035,540 B2 | 10/2011 | Berkley et al. |
| 8,098,179 B2 | 1/2012 | Bunyk et al. |
| 8,169,231 B2 | 5/2012 | Berkley |
| 8,174,305 B2 | 5/2012 | Harris |
| 8,190,548 B2 | 5/2012 | Choi |
| 8,195,596 B2 | 6/2012 | Rose et al. |
| 8,421,053 B2 | 4/2013 | Bunyk et al. |
| 2003/0169041 A1* | 9/2003 | Coury ................... B82Y 10/00 324/307 |

(Continued)

FOREIGN PATENT DOCUMENTS

WO    2014/123980 A1    8/2014

OTHER PUBLICATIONS

Amin et al., "First Order Quantum Phase Transition in Adiabatic Quantum Computation," arXiv:0904.1387v3, Dec. 15, 2009, 5 pages.

(Continued)

*Primary Examiner* — Min Huang
(74) *Attorney, Agent, or Firm* — Cozen O'Connor

(57) ABSTRACT

Techniques for improving the performance of a quantum processor are described. Some techniques employ reducing intrinsic/control errors by using quantum processor-wide problems specifically crafted to reveal errors so that corrections may be applied. Corrections may be applied to physical qubits, logical qubits, and couplers so that problems may be solved using quantum processors with greater accuracy.

8 Claims, 13 Drawing Sheets

(56) References Cited

U.S. PATENT DOCUMENTS

| | | | | |
|---|---|---|---|---|
| 2005/0008050 | A1* | 1/2005 | Fischer | H01S 5/042 |
| | | | | 372/38.1 |
| 2008/0052055 | A1* | 2/2008 | Rose | G06F 19/16 |
| | | | | 703/11 |
| 2009/0121215 | A1* | 5/2009 | Choi | B82Y 10/00 |
| | | | | 257/31 |
| 2009/0289638 | A1* | 11/2009 | Farinelli | B82Y 10/00 |
| | | | | 324/652 |
| 2011/0054876 | A1* | 3/2011 | Biamonte | B82Y 10/00 |
| | | | | 703/15 |
| 2011/0060780 | A1 | 3/2011 | Berkley et al. | |
| 2012/0023053 | A1 | 1/2012 | Harris et al. | |
| 2012/0087867 | A1* | 4/2012 | McCamey | A61K 49/06 |
| | | | | 424/9.3 |
| 2013/0106476 | A1* | 5/2013 | Joubert | H03L 1/00 |
| | | | | 327/156 |
| 2013/0267032 | A1* | 10/2013 | Tsai | G01N 21/78 |
| | | | | 436/95 |
| 2014/0223224 | A1 | 8/2014 | Berkley | |
| 2014/0229722 | A1 | 8/2014 | Harris | |
| 2015/0032993 | A1 | 1/2015 | Amin et al. | |
| 2015/0032994 | A1 | 1/2015 | Chudak et al. | |
| 2015/0262073 | A1 | 9/2015 | Lanting | |
| 2016/0267032 | A1* | 9/2016 | Rigetti | G06N 99/002 |

OTHER PUBLICATIONS

Bocko et al., "Prospects for Quantum Coherent Computation Using Superconducting Electronics," *IEEE Transactions on Applied Superconductivity* 7(2):3638-3641, Jun. 1997.

Clarke et al., "Superconducting quantum bits," *Nature* 453:1031-1042, Jun. 19, 2008.

Devoret et al., "Superconducting Circuits for Quantum Information: An Outlook," *Science* 339:1169-1174, Mar. 8, 2013.

Devoret et al., "Superconducting Qubits: A Short Review," arXiv:cond-mat/0411174v1, Nov. 7, 2004, 41 pages.

Friedman et al., "Quantum superposition of distinct macroscopic states," *Nature* 406:43-46, Jul. 6, 2000.

Hamze et al., "Systems and Methods for Problem Solving via Solvers Employing Problem Modification," U.S. Appl. No. 62/040,643, filed Aug. 22, 2014, 80 pages.

Harris et al., "A Compound Josephson Junction Coupler for Flux Qubits With Minimal Crosstalk," arXiv:0904.3784v3, Jul. 16, 2009, 5 pages.

Harris et al., "Experimental Demonstration of a Robust and Scalable Flux Qubit," arXiv:0909.4321v1, Sep. 24, 2009, 20 pages.

Harris et al., "Experimental Investigation of an Eight-Qubit Unit Cell in a Superconducting Optimization Processor," arXiv:1004.1628v2, Jun. 28, 2010, 16 pages.

Lanting et al., "Geometrical dependence of the low-frequency noise in superconducting flux qubits," *Physical Review B* 79:060509, 2009, 4 pages.

Lanting et al., "Method of Forming Superconducting Wiring Layers With Low Magnetic Noise," U.S. Appl. No. 62/120,723, filed Feb. 25, 2015, 64 pages.

Lanting et al., "Systems and Methods for Improving the Performance of a Quantum Processor by Reducing Errors," U.S. Appl. No. 61/858,011, filed Jul. 24, 2013, 45 pages.

Lanting et al., "Systems and Methods for Improving the Performance of a Quantum Processor by Shimming to Reduce Intrinsic/Control Errors," U.S. Appl. No. 62/040,890, filed Aug. 22, 2014, 122 pages.

Makhlin et al., "Quantum-state engineering with Josephson-junction devices," *Reviews of Modern Physics* 73(2):357-400, Apr. 2001.

Martinis, "Superconducting phase qubits," *Quantum Inf Process* 8:81-103, 2009.

Mooij et al., "Josephson Persistent-Current Qubit," *Science* 285:1036-1039, Aug. 13, 1999.

Orlando et al., "Superconducting persistent-current qubit," *Physical Review B* 60(22):15398-15413, Dec. 1, 1999.

Ranjbar, "Systems and Methods for Problem Solving via Solvers Employing Post-Processing That Overlaps With Processing," U.S. Appl. No. 62/040,646, filed Aug. 22, 2014, 84 pages.

Ranjbar, "Systems and Methods for Problem Solving via Solvers Employing Selection of Heuristic Optimizer(s)," U.S. Appl. No. 62/040,661, filed Aug. 22, 2014, 88 pages.

Raymond, "Systems and Methods for Improving the Performance of a Quantum Processor via Reduced Readouts," U.S. Appl. No. 62/048,043, filed Sep. 9, 2014, 101 pages.

Zagoskin et al., "Superconducting Qubits," *La Physique au Canada* 63(4):215-227, 2007.

\* cited by examiner

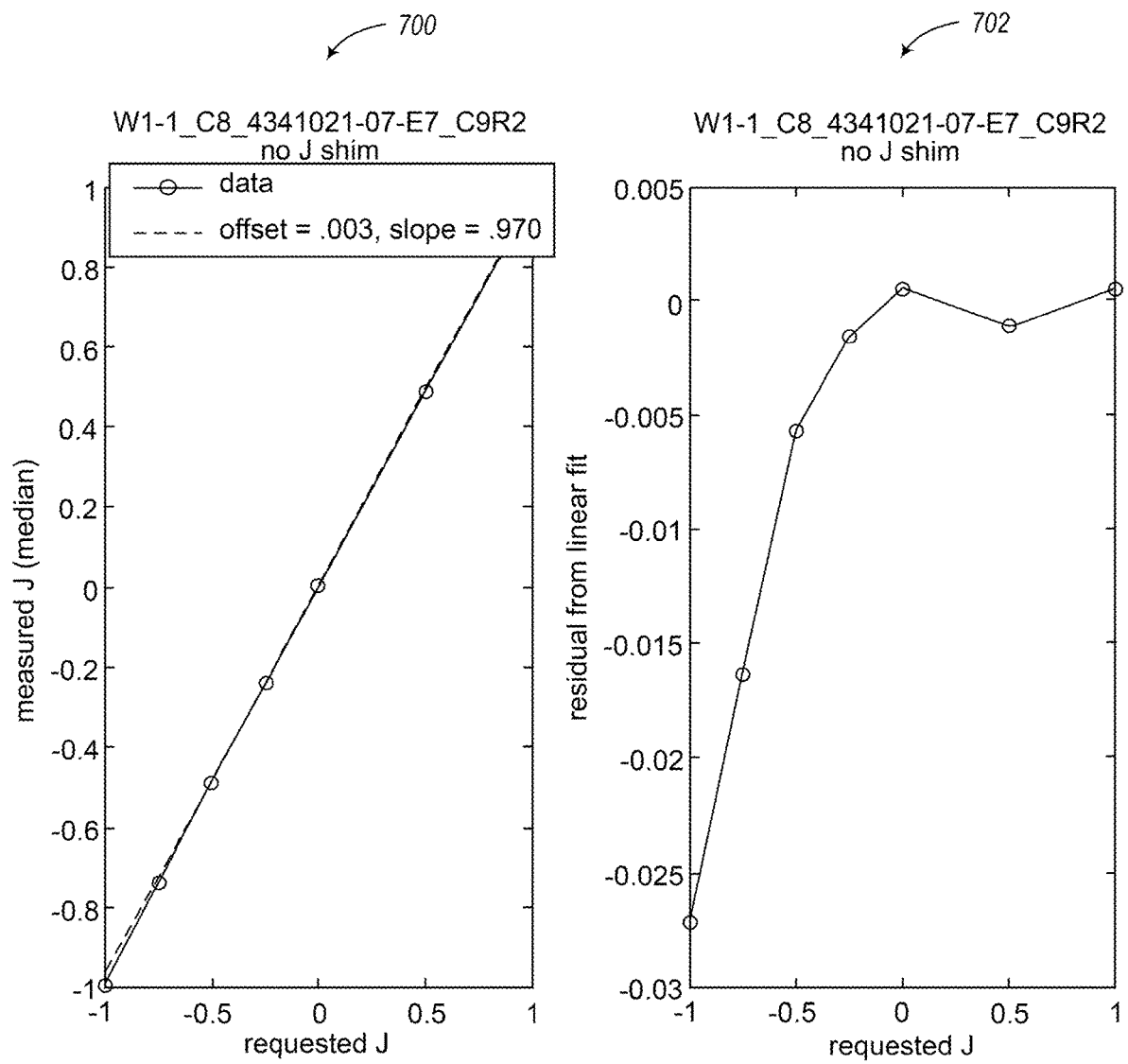
FIG. 7A  FIG. 7B

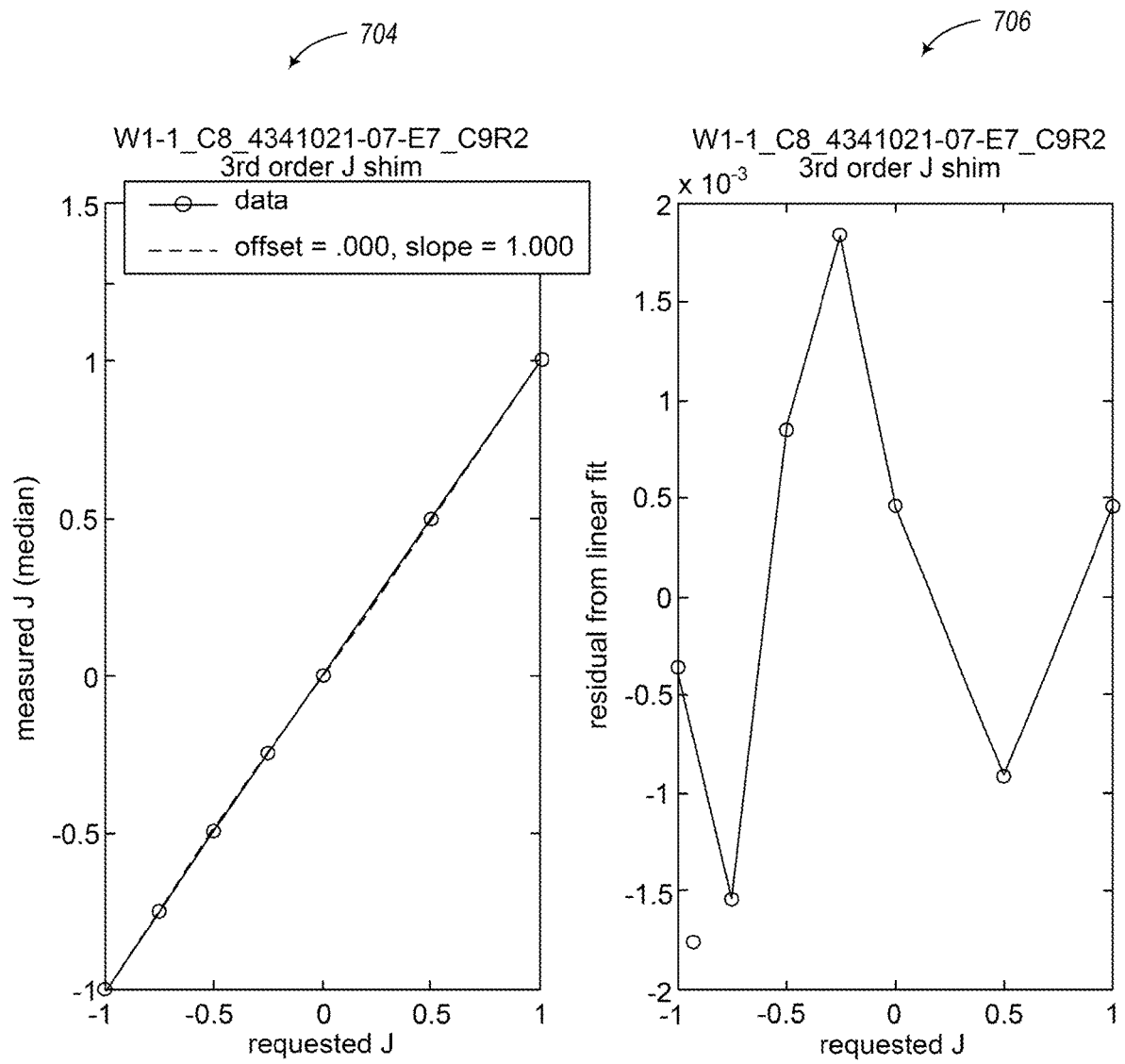
FIG. 7C   FIG. 7D

SYSTEMS AND METHODS FOR IMPROVING THE PERFORMANCE OF A QUANTUM PROCESSOR TO REDUCE INTRINSIC/CONTROL ERRORS

BACKGROUND

Field

This disclosure generally relates to computationally solving problems.

Solvers

A solver is a mathematical-based set of instructions executed via hardware that is designed to solve mathematical problems. Some solvers are general purpose solvers, designed to solve a wide type or class of problems. Other solvers are designed to solve specific types or classes of problems. A non-limiting exemplary set of types or classes of problems includes: linear and non-linear equations, systems of linear equations, non-linear systems, systems of polynomial equations, linear and non-linear optimization problems, systems of ordinary differential equations, satisfiability problems, logic problems, constraint satisfaction problems, shortest path or traveling salesperson problems, minimum spanning tree problems, and search problems.

There are numerous solvers available, most of which are designed to execute on classical computing hardware, that is computing hardware that employs digital processors and/or processor-readable nontransitory storage media (e.g., volatile memory, non-volatile memory, disk based media). More recently, solvers designed to execute on non-classical computing hardware are becoming available, for example solvers designed to execute on analog computers, for instance an analog computer including a quantum processor.

Adiabatic Quantum Computation

Adiabatic quantum computation typically involves evolving a system from a known initial Hamiltonian (the Hamiltonian being an operator whose eigenvalues are the allowed energies of the system) to a final Hamiltonian by gradually changing the Hamiltonian. A simple example of an adiabatic evolution is given by:

$$H_e = (1-s)H_i + sH_f \quad (0a)$$

where $H_i$ is the initial Hamiltonian, $H_f$ is the final Hamiltonian, $H_e$ is the evolution or instantaneous Hamiltonian, and s is an evolution coefficient which controls the rate of evolution. As the system evolves, the evolution coefficient s goes from 0 to 1 such that at the beginning (i.e., s=0) the evolution Hamiltonian $H_e$ is equal to the initial Hamiltonian $H_i$ and at the end (i.e., s=1) the evolution Hamiltonian $H_e$ is equal to the final Hamiltonian $H_f$. Before the evolution begins, the system is typically initialized in a ground state of the initial Hamiltonian $H_i$ and the goal is to evolve the system in such a way that the system ends up in a ground state of the final Hamiltonian $H_f$ at the end of the evolution. If the evolution is too fast, then the system can transition to a higher energy state, such as the first excited state. Generally, an "adiabatic" evolution is considered to be an evolution that satisfies the adiabatic condition:

$$\dot{s}\langle 1|dH_e/ds|0\rangle = \delta g^2(s) \quad (0b)$$

where $\dot{s}$ is the time derivative of s, g(s) is the difference in energy between the ground state and first excited state of the system (also referred to herein as the "gap size") as a function of s, and $\delta$ is a coefficient much less than 1. Generally the initial Hamiltonian $H_i$ and the final Hamiltonian $H_f$ do not commute. That is, $[H_i, H_f] \neq 0$.

The process of changing the Hamiltonian in adiabatic quantum computing may be referred to as evolution. The rate of change, for example, change of s, is slow enough that the system is always in the instantaneous ground state of the evolution Hamiltonian during the evolution, and transitions at anticrossings (i.e., when the gap size is smallest) are avoided. The example of a linear evolution schedule is given above. Other evolution schedules are possible including non-linear, parametric, and the like. Further details on adiabatic quantum computing systems, apparatus, and methods are described in, for example, U.S. Pat. Nos. 7,135,701 and 7,418,283.

Quantum Annealing

Quantum annealing is a computation method that may be used to find a low-energy state, typically preferably the ground state, of a system. Similar in concept to classical annealing, the method relies on the underlying principle that natural systems tend towards lower energy states because lower energy states are more stable. However, while classical annealing uses classical thermal fluctuations to guide a system to a low-energy state and ideally its global energy minimum, quantum annealing may use quantum effects, such as quantum tunneling, to reach a global energy minimum more accurately and/or more quickly than classical annealing. In quantum annealing, thermal effects and other noise may be present to aid the annealing. However, the final low-energy state may not be the global energy minimum. Adiabatic quantum computation, therefore, may be considered a special case of quantum annealing for which the system, ideally, begins and remains in its ground state throughout an adiabatic evolution. Thus, those of skill in the art will appreciate that quantum annealing systems and methods may generally be implemented on an adiabatic quantum computer. Throughout this specification and the appended claims, any reference to quantum annealing is intended to encompass adiabatic quantum computation unless the context requires otherwise.

Quantum annealing uses quantum mechanics as a source of disorder during the annealing process. The optimization problem is encoded in a Hamiltonian $H_P$, and the method introduces quantum effects by adding a disordering Hamiltonian $H_D$ that does not commute with $H_P$. An example case is:

$$H_E \propto A(t)H_D + B(t)H_P, \quad (0c)$$

where A(t) and B(t) are time dependent envelope functions. The Hamiltonian $H_E$ may be thought of as an evolution Hamiltonian similar to $H_e$ described in the context of adiabatic quantum computation above. The delocalization may be removed by removing $H_D$ (i.e., reducing A(t)). The delocalization may be added and then removed. Thus, quantum annealing is similar to adiabatic quantum computation in that the system starts with an initial Hamiltonian and evolves through an evolution Hamiltonian to a final "problem" Hamiltonian $H_P$ whose ground state encodes a solution to the problem. If the evolution is slow enough, the system will typically settle in the global minimum (i.e., the exact solution), or in a local minimum close in energy to the exact solution. The performance of the computation may be assessed via the residual energy (difference from exact solution using the objective function) versus evolution time. The computation time is the time required to generate a residual energy below some acceptable threshold value. In quantum annealing, $H_P$ may encode an optimization problem but the system does not necessarily stay in the ground state at all times. The energy landscape of Hp may be crafted so that its global minimum is the answer to the problem to be solved, and low-lying local minima are good approximations.

Persistent Current

A superconducting flux qubit (such as a radio frequency superconducting quantum interference device; "rf-SQUID") may comprise a loop of superconducting material (called a "qubit loop") that is interrupted by at least one Josephson junction. Since the qubit loop is superconducting, it effectively has no electrical resistance. Thus, electrical current traveling in the qubit loop may experience no dissipation. If an electrical current is coupled into the qubit loop by, for example, a magnetic flux signal, this current may continue to circulate around the qubit loop even when the signal source is removed. The current may persist indefinitely until it is interfered with in some way or until the qubit loop is no longer superconducting (due to, for example, heating the qubit loop above its critical temperature). For the purposes of this specification, the term "persistent current" is used to describe an electrical current circulating in the qubit loop of a superconducting qubit. The sign and magnitude of a persistent current may be influenced by a variety of factors, including but not limited to a flux signal $\Phi_x$ coupled directly into the qubit loop and a flux signal $\Phi_{CJJ}$ coupled into a compound Josephson junction that interrupts the qubit loop.

Quantum Processor

A quantum processor may take the form of a superconducting quantum processor. A superconducting quantum processor may include a number of qubits and associated local bias devices. A superconducting quantum processor may also employ couplers to provide tunable communicative connections between qubits. A qubit and a coupler resemble each other but differ in physical parameters. One difference is the parameter, β. Consider an rf-SQUID, which is a superconducting loop interrupted by a Josephson junction. The parameter β is the ratio of the inductance of the Josephson junction to the geometrical inductance of the loop. A design with lower values of β, about 1, behaves more like a simple inductive loop, a monostable device. A design with higher values is more dominated by the Josephson junctions, and is more likely to have bistable behavior. The parameter β is defined as $2\pi L I_c/\Phi_0$. That is, β is proportional to the product of inductance and critical current. One can vary the inductance, for example. A qubit can possess a larger inductance than a coupler. The qubit is often a bistable device and the coupler is often a monostable device. Alternatively the critical current can be varied, or the product of the critical current and inductance can be varied. A qubit often will have more devices associated with it. Further details and embodiments of exemplary quantum processors that may be used in conjunction with the present systems and devices are described in, for example, U.S. Pat. Nos. 7,533,068; 8,008,942; 8,195,596; 8,190,548; and 8,421,053.

Many techniques for using quantum annealing to solve computational problems involve finding ways to directly map/embed a representation of a problem to the quantum processor. Generally, a problem is solved by first casting the problem in a contrived formulation (e.g., Ising spin glass, QUBO, etc.) because that particular formulation maps directly to the particular embodiment of the quantum processor being employed. A QUBO with N variables, or spins $s \in [-1, +1]$, may be written as a cost function of the form:

$$E(s) = \sum_{i}^{N} h_i s_i + \sum_{i<j} J_{ij} s_i s_j, \tag{1}$$

where $h_i$ and $J_{ij}$ are dimensionless quantities that specify a desired Ising spin glass instance. Solving this problem involves finding the spin configuration $s_i$ that minimizes E for the particular set of $h_i$ and $J_{ij}$ provided. In some implementations, the allowed range of $h_i \in [-2, 2]$ and $J_{ij} \in [-1, 1]$.

Intrinsic/Control Error (ICE)

For various reasons, the $h_i$ and $J_{ij}$ are not perfectly represented on the hardware during optimization. These misrepresentations may be defined as control errors:

$$h_i \rightarrow h_i \pm \delta h_i \tag{2a}$$

$$J_{ij} \rightarrow J_{ij} \pm \delta J_{ij} \tag{2b}$$

Control errors δh and δJ arise from multiple sources. Some sources of error are time dependent and others are static, but depend on a particular suite of h and J values.

A quantum processor may implement a time-dependent Hamiltonian of the following form:

$$\frac{\mathcal{H}(i)}{\mathcal{J}_{AFM}(t)} = -\sum_i h_i \sigma_x^{(i)} + \sum_{i,j>i} J_{ij} \sigma_z^{(i)} \sigma_z^{(j)} - \sum_i \Gamma_i(t) \sigma_x^{(i)} \tag{3a}$$

where $\Gamma_i(t)$ is a dimensionless quantity describing the amplitude of the single spin quantum tunneling, and $J_{AFM}(t)$ is an overall energy scale. Equation 3a is the desired or target Hamiltonian. Quantum annealing is realized by guiding the system through a quantum phase transition from a delocalized ground state at t=0, subject to $\Gamma_i$ (t=0)»$h_i$, $J_{ij}$, to a localized spin state at t=$t_f$, subject to $\Gamma_i(t_f)$«$h_i$, $J_{ij}$. Further details concerning this evolution can be found in Harris et al., Experimental investigation of an eight-qubit unit cell in a superconducting optimization processor, Phys. Rev. B, Vol. 82, Issue 2, 024511, 2010 ("Harris 2010b"). The Hamiltonian given by equation 3a may be implemented on quantum annealing processors using networks of inductively coupled superconducting flux qubits and couplers as described in, for example Harris et al., Compound Josephson-junction coupler for flux qubits with minimal crosstalk, Phys. Rev. B, Vol. 80, Issue 5, 052506, 2009 ("Harris 2009") and Harris et al., Experimental demonstration of a robust and scalable flux qubit, Phys. Rev. B, Vol. 81, Issue 13, 134510 ("Harris 2010a"). As described in Harris 2010b, the dimensionless parameters $h_i$, $J_{ij}$, and $\Gamma_i(t)$ map onto physical device parameters in the following manner:

$$h_i = \frac{|I_i^p(t)|(\Phi_i^x(t) - \Phi_i^0)}{\mathcal{J}_{AFM}(t)} \tag{3b}$$

$$J_{ij} = \frac{M_{ij}|I_i^p(t)||I_j^p(t)|}{\mathcal{J}_{AFM}(t)} \tag{3c}$$

$$\Gamma_i(t) = \frac{\Delta_i(t)}{2\mathcal{J}_{AFM}(t)} \tag{3d}$$

where $\Phi_i^x(t)$ is a time-dependent flux bias applied to a qubit i, $\Phi_i^0$ is the nominally time-independent degeneracy point of qubit i, and $M_{ij}$ is the effective mutual inductance provided by the tunable interqubit coupler between qubits i and j. The time-dependent quantities $|I_i^p(t)|$ and $\Delta_i(t)$ correspond to the magnitude of the qubit persistent current and tunneling energy, respectively, of qubit i. Averages of these quantities across a processor are indicated by $|I_i^p(t)|$ and $\Delta_i(t)$. The global energy scale $\mathcal{J}_{AFM}(t) \equiv M_{AFM}|I_i^p(t)|$ given by the Hamiltonian in equation 3a has been defined in terms of the average qubit persistent current $|I_i^p(t)|$ and the maximum antiferromagnetic (AFM) mutual inductance $M_{AFM}$ that can be achieved by all couplers across a processor.

Quantum annealing implemented on a quantum processor aims to realize time-independent $h_i$ and $J_{ij}$. The reason for doing so is to ensure that the processor realizes the target Ising spin glass instance independent of during the course of quantum annealing the state of the system localizes via a quantum phase transition. Equation 3c naturally yields a time-independent quantity upon substituting the definition of $J_{AFM}$ (t) and assuming that:

$$|I_i^p(t)|=|I_j^p(t)|=|I_q^p(t)|.$$

In order to expunge the time-dependence from $h_i$ in Equation 3b, subject to the assumption that:

$$|I_i^p(t)|=|I_q^p(t)|,$$

time-dependent flux bias applied to the i-th qubit $\Phi_i^x(t)$ of the form:

$$\Phi_i^x(t)=M_i\alpha|I_q^p(t)|+\Phi_i^0 \quad (3e)$$

should be applied where $\alpha$ $|I_q^p(t)|$ represents an externally supplied bias current that emulates the evolution of the qubit persistent current $|I_q^p(t)|$ multiplied by a dimensionless factor $\alpha \gg 1$ and $M_i \equiv h_i M_{AFm}/\alpha$ is the effective mutual inductance between the aforementioned external current bias and the body of qubit i. The logic leading to equation 3e and its implementation in hardware is discussed in detail in Harris 2010b.

Equations 3a-3e link the dimensionless user-specified quantities $h_i$ and $J_{ij}$ that define an Ising spin glass instance to the physical properties of qubits and couplers. These hardware elements are subject to practical constraints, both in design and fabrication that ultimately limit the amount of control that the user can exert on the Ising spin glass parameters $h_i$ and $J_{ij}$. The term Intrinsic/Control Error (ICE) defines the resolution to which one $h_i$ and $J_{ij}$ can be realized on a quantum processor (i.e., chip). Sources of error can be classified based on whether they are due to some intrinsic non-ideality of a particular device on a chip or whether they are due to the finite resolution of some control structure. Arguably, the resolution to which $\Gamma_i$ can be controlled could have significant bearing on the efficacy of quantum annealing. For the purpose of the present systems and methods, it is assumed that all $\Gamma_i(t)$ are identical.

The impact of ICE can be characterized by modifying the definitions of $h_i$ and $J_{ij}$ given above to include physical sources of error:

$$h_i \rightarrow \frac{(|I_q^p(t)|+\delta|I_i^p(t)|)(\Phi_i^x(t)-\Phi_i^0-\delta\Phi_i^0)}{\mathcal{J}_{AFM}(t)} \quad (4a)$$

$$J_{ij} \rightarrow \frac{(M_{ij}+\delta M_{ij})(|I_i^p(t)|+\delta|I_i^p(t)|)(|I_q^p(t)|+\delta|I_j^p(t)|)}{\mathcal{J}_{AFM}(t)} \quad (4b)$$

$$\Phi_i^x(t) \rightarrow (M_i+\delta M_i)\alpha|I_q^p(t)|+\Phi_i^0 \quad (4c)$$

where the assumption is that the global variables $M_{AFM}$, $|I_q^p(t)|$, and $\alpha$ have been calibrated to high precision. A sparse network of analog control lines that allow for high precision one- and two-qubit operations can be used in order to calibrate these quantities. Thus, $\delta|I_i^p(t)|$, $\delta|I_j^p(t)|$, $\delta\Phi_i^0$, $\delta M_i$, and $\delta M_{ij}$ represent the perturbations that give rise to errors in $h_i$ and $J_{ij}$. Generally, these perturbations are small and so therefore it may be neglected in the present systems and methods so that only the errors in $h_i$ and $J_{ij}$ that are first order are taken into consideration.

If the deviations in the qubit persistent current $\delta|I_i^p(t)|\neq 0$ and $\delta|I_j^p(t)|\neq 0$ and if all other deviations are set to zero, recalling that in the ideal case $M_i \equiv h_i^* M_{AFM}/\alpha$ and $M_{ij} \equiv J_{ij}^* M_{AFM}$, substituting equation 4c into equation 4a and 4b then yields errors in the instance parameters of the following form:

$$\delta h_i = h_i \frac{\delta|I_i^p(t)|}{|I_q^p(t)|} \quad (5a)$$

$$\delta, I_{ij} = J_{ij}\sqrt{\left[\frac{\delta|I_i^p(t)|}{|I_q^p(t)|}\right]^2+\left[\frac{\delta|I_j^p(t)|}{|I_q^p(t)|}\right]^2} \rightarrow J_{ij}2\frac{\delta|I_i^p(t)|}{|I_q^p(t)|} \quad (5b)$$

where the assumption in the formula for $\delta J_{ij}$ is the absolute worst-case scenario in which the deviations of the two persistent currents are correlated and equal in magnitude.

Deviations in the mutual inductance $\delta M_i \neq 0$, with all others set to zero, only affect $h_i$. Substituting equation 4c into equation 4a yields:

$$\delta h_i = \frac{\delta M_i}{M_{AFM}/\alpha} \quad (5c)$$

Likewise, deviations of the qubit degeneracy point $\delta\Phi_i^0$, with all others set to zero, also only affect $h_i$. Substituting equation 4c into equation 4a yields a time dependent error:

$$\delta h_i = \frac{\delta\Phi_i^0}{M_{AFM}/|I_q^p(t)|}. \quad (5d)$$

Finally, deviations in interqubit coupling mutual inductance $\delta M_{ij}$, with all others set to zero, only affect $J_{ij}$ as shown below:

$$\delta J_{ij} = \frac{\delta M_{ij}}{M_{AFM}}. \quad (5e)$$

It is worth noting that deviations in the qubit persistent current $\delta|I_i^p(t)|\neq 0$ and $\delta|I_j^p(t)|\neq 0$ lead to relative errors in the problem instance settings, as given by equations 5a and 5b. In contrast, deviations in mutual inductances and flux offsets lead to absolute errors. One convention defines the allowed range of problem instance specifications to be $-1 \leq h_i$, $J_{ij} \leq 1$. For relative errors, an upper bound on an absolute error is realized if $|h_i|=|J_{ij}|=1$.

Equations 5a to 5e produce absolute errors (or upper bounds on absolute errors) as a function of perturbations in qubit persistent current $\delta|I_i^p(t)|$, qubit degeneracy point $\delta\Phi_i^0$, mutual inductance $\delta M_i$, and interqubit coupling $\delta M_{ij}$. Identifying the physical mechanisms that give rise to these four quantities and studying worst-case scenarios under which those mechanisms give rise to ICE may help reduce such errors.

BRIEF SUMMARY

A computational system may be summarized as including at least one quantum processor comprising a plurality of qubits and a plurality of couplers, each of the plurality of qubits having a respective controllable local bias term and each of the plurality of couplers having a respective controllable coupling term; at least one processor-based device communicatively coupled to the at least one quantum processor; and at least one non-transitory processor-readable storage medium communicatively coupled to the at least one processor-based device and that stores at least one of processor-executable instructions or data, where in use the at least one processor-based device: causes the at least one quantum processor to set each of the coupling terms to a first calibrated zero value; causes the at least one quantum processor to set each of the local bias terms to a target value relative to a second calibrated zero value; calibrates the local bias terms for the respective qubits, wherein, for each qubit in the plurality of qubits, the at least one processor-based device: obtains a number of samples via the at least one quantum processor; constructs an estimate of a population for the qubit using the obtained number of samples; determines whether the qubit exhibits a bias toward a basis state; and modifies the local bias term of the qubit to generate an updated local bias term upon determination that the qubit exhibits a bias toward a basis state to remove the bias. The at least one processor-based device may iteratively calibrate the local bias terms for the respective qubits until one or more criteria are met. The one or more criteria may include at least one of: an elapsed calibration time, a number of calibration iterations, or a bias threshold.

Each of the plurality of qubits is superconducting below a critical temperature, and prior to calibration of the local bias terms and while each of the plurality of qubits is maintained at or below the critical temperature, the at least one processor-based device: may initialize the at least one quantum processor in a first configuration embodying an initialization Hamiltonian; and may evolve the quantum processor until the quantum system is described by a second configuration embodying a problem Hamiltonian.

The at least one processor-based device may repeat the initialization and evolution of the at least one quantum processor for at least N iterations, where N>1; and may repeat the calibration of the local bias terms after at least one of the initialization and evolution iterations while the plurality of qubits is maintained at an operating temperature.

The at least one processor-based device may calibrate the local bias terms after the plurality of qubits have had sufficient time to thermalize and arrive at a base temperature.

A method of operation for a computational system, the computational system including at least one quantum processor which comprises a plurality of qubits and a plurality of couplers, each of the plurality of qubits having a respective controllable local bias term and each of the plurality of couplers having a respective controllable coupling term, the computational system further including at least one processor-based device communicatively coupled to configure the at least one quantum processor may be summarized as including causing, via the at least one processor-based device, the at least one quantum processor to set each of the coupling terms to a first calibrated zero value; causing, via the at least one processor-based device, the at least one quantum processor to set each of the local bias terms to a target value relative to a second calibrated zero value; calibrating the local bias terms for the respective qubits by, for each qubit in the plurality of qubits, obtaining a number of samples via the at least one quantum processor; constructing an estimate of a population for the qubit using the obtained number of samples; determining whether the qubit exhibits a bias toward a basis state; and modifying the local bias term of the qubit to generate an updated local bias term upon determination that the qubit exhibits a bias toward a basis state to remove the bias.

The method may further include iteratively calibrating the local bias terms for the respective qubits until one or more criteria are met. Iteratively calibrating the local bias terms for the respective qubits until one or more criteria are met may include iteratively calibrating the local bias terms for the respective qubits until one or more criteria are met, the one or more criteria comprises at least one of: an elapsed calibration time, a number of calibration iterations, or a bias threshold.

The method wherein each of the plurality of qubits is superconducting below a critical temperature may further include maintaining the plurality of qubits at or below the critical temperature; prior to calibrating the local bias terms, initializing the at least one quantum processor in a first configuration embodying an initialization Hamiltonian; and evolving the quantum processor until the quantum system is described by a second configuration embodying a problem Hamiltonian.

The method may further include repeatedly initializing and evolving the at least one quantum processor for at least N iterations, where N>1; and repeatedly calibrating the local bias terms after at least one of the initialization and evolution iterations while the plurality of qubits is maintained at an operating temperature. Calibrating the local bias terms may include calibrating the local bias terms after the plurality of qubits have had sufficient time to thermalize and arrive at a base temperature.

A computational system may be summarized as including at least one quantum processor comprising at least two qubits and a coupler that provides controllable communicative coupling between the at least two qubits, each of the plurality of qubits having a respective controllable local bias term and the coupler having a controllable coupling term; at least one processor-based device communicatively coupled to the at least one quantum processor; and at least one non-transitory processor-readable storage medium communicatively coupled to the at least one processor-based device and that stores at least one of processor-executable instructions or data, where in use the at least one processor-based device: calibrates the coupling term of the coupler, wherein, for each of a plurality of target coupling term values for the coupling term of the coupler, the at least one processor-based device: causes the at least one quantum processor to set the coupling term of the coupler to the target coupling term value; for each of a plurality of local bias values, causes the at least one quantum processor to set the local bias term for the at least two qubits to the local bias value; obtains a number of samples via the at least one quantum processor; assesses the obtained number of samples relative to a model to extract an effective coupling term value for the coupler; compares the extracted effective coupling term value for the coupler with the target coupling term value; adjusts the target coupling term values based at least in part on a result of the comparison of the extracted effective coupling term values with the target coupling term values. The at least one processor-based device may adjust the target coupling term values using a polynomial regression model calculation. The at least one processor-based device may adjust the target coupling term values using a third order polynomial regression model calculation. The plurality of target coupling term values may be distributed throughout a range of permissible coupling term values. The plurality of local bias values may be distributed throughout a range of permissible local bias values. The at least two qubits may be superconducting below a critical temperature, and prior to calibration of the coupling term and while each of the plurality of qubits is maintained at or below the critical temperature, the at least one processor-based device may initialize the at least one quantum processor in a first configuration embodying an initialization Hamiltonian; and may evolve the quantum processor until the quantum system is described by a second configuration embodying a problem Hamiltonian. The at least one processor-based device may repeat the initialization and evolution of the at least one quantum processor for at least N iterations, where N>1; and may repeat the calibration of the coupling term after at least one of the at least N initialization and evolution iterations while the plurality of qubits is maintained at an operating temperature. The at least one processor-based device may calibrate the coupling term after the plurality of qubits have had sufficient time to thermalize and arrive at a base temperature.

A method of operation for a computational system, the computational system including at least one quantum processor which comprises a plurality of qubits and a plurality of couplers, each of the plurality of qubits having a respective controllable local bias term and each of the plurality of couplers having a respective controllable coupling term, the computational system further including at least one processor-based device communicatively coupled to configure the at least one quantum processor may be summarized as including calibrating the coupling term of the coupler by, for each of a plurality of target coupling term values for the coupling term of the coupler, causing, via the at least one processor-based device, the at least one quantum processor to set the coupling term of the coupler to the target coupling term value; for each of a plurality of local bias values, causing the at least one quantum processor to set the local bias term for the at least two qubits to the local bias value; obtaining a number of samples via the at least one quantum processor; assessing the obtained number of samples relative to a model to extract an effective coupling term value for the coupler; comparing the extracted effective coupling term value for the coupler with the target coupling term value; adjusting the target coupling term values based at least in part on a result of the comparison of the extracted effective coupling term values with the target coupling term values. Adjusting the target coupling term values may include adjusting the target coupling term values using a polynomial regression model calculation. Adjusting the target coupling term values may include adjusting the target coupling term values using a third order polynomial regression model calculation. Calibrating the coupling term of the coupler may include using target coupling term values that are distributed throughout a range of permissible coupling term values. Calibrating the coupling term of the coupler may include using local bias values that are distributed throughout a range of permissible local bias values.

The method wherein the at least two qubits are superconducting below a critical temperature may further include maintaining the plurality of qubits at or below the critical temperature; prior to calibrating the coupling term, initializing the at least one quantum processor in a first configuration embodying an initialization Hamiltonian; and evolving the quantum processor until the quantum system is described by a second configuration embodying a problem Hamiltonian.

The method may further include repeatedly initializing and evolving the at least one quantum processor for at least N iterations, where N>1; and repeatedly calibrating the coupling term after at least one of the at least N initialization and evolution iterations while the plurality of qubits is maintained at an operating temperature. Calibrating the coupling term may include calibrating the coupling term after the plurality of qubits have had sufficient time to thermalize and arrive at a base temperature.

A computational system may be summarized as including at least one quantum processor comprising: a plurality of physical qubits, each of the physical qubits having a respective local bias term operable to supply the physical qubit with inputs to solve a problem; and a plurality of physical qubit couplers, each of the physical qubit couplers couples a respective set of the physical qubits, each of the plurality of physical qubit couplers having a respective controllable coupling term, wherein a first number of the physical qubit couplers are operated as intra-logical qubit couplers where each of the first number of the physical qubit couplers have a respective coupling strength that couples a respective set of the physical qubits as a logical qubit, where each logical qubit represents a variable from the problem; and a second number of the physical qubit couplers are operated as inter-logical qubit couplers, wherein each of the second number of the physical qubit couplers have a respective coupling strength that controllably couples a respective group or collection of the physical qubits, where the physical qubits in the respective group or collection are part of different ones of the logical qubits and wherein at least two variables from the problem are assigned to two respective logical qubits; at least one processor-based device communicatively coupled to the at least one quantum processor; and at least one non-transitory processor-readable storage medium communicatively coupled to the at least one processor-based device and that stores at least one of processor-executable instructions or data, where in use the at least one processor-based device: causes the at least one quantum processor to set each of the coupling terms of respective intra-logical qubit couplers to a value that provides a coupling strength that couples a respective set of the physical qubits as a logical qubit; causes the at least one quantum processor to set each of the coupling terms of the inter-logical qubit couplers to a target value relative to a first calibrated zero value; causes the at least one quantum processor to set each of the local bias terms to a second calibrated zero value; and calibrates the local bias terms for the qubits, wherein, for each logical qubit, the at least one processor-based device: obtains a number of samples via the at least one quantum processor; constructs an estimate of a population for the logical qubit using the obtained number of samples; determines whether the logical qubit exhibits a bias toward a basis state; and modifies the local bias term of at least one qubit forming the logical qubit upon determination that the logical qubit exhibits a bias toward a basis state to remove the bias.

In some implementations, each of the physical qubit couplers coupling a respective set or group of the physical qubits can be a physical qubit coupler coupling a respective pair of the physical qubits.

For each logical qubit, the processor-based device may modify the local bias term of each of the qubits forming the logical qubit upon determination that the logical qubit exhibits a bias toward a basis state to remove the bias. For each logical qubit, the processor-based device may modify the local bias term of each of the qubits forming the logical qubit by a bias adjustment value upon determination that the logical qubit exhibits a bias toward a basis state to remove the bias. The at least one processor-based device may iteratively calibrate the local bias terms until one or more criteria are met. For successive calibration iterations, the at least one processor-based device may modify the local bias term of each of the qubits forming the logical qubit by a bias adjustment value less than a bias adjustment value used on a previous calibration iteration. The one or more criteria may include at least one of: an elapsed calibration time, a number of calibration iterations, or a bias threshold.

The computational system wherein each of the plurality of qubits is superconducting below a critical temperature, and prior to calibration of the local bias terms and while each of the plurality of qubits is maintained at or below the critical temperature, the at least one processor-based device may initialize the at least one quantum processor in a first configuration embodying an initialization Hamiltonian; and may evolve the quantum processor until the quantum system is described by a second configuration embodying a problem Hamiltonian. The at least one processor-based device may repeat the initialization and evolution of the at least one quantum processor for at least N iterations, where N>1; and may repeat the calibration of the local bias terms after at least one of the initialization and evolution iterations while the plurality of qubits is maintained at an operating temperature. The at least one processor-based device may calibrate the local bias terms after the plurality of qubits have had sufficient time to thermalize and arrive at a base temperature.

A method of operation for a computational system, the computational system including at least one quantum processor which comprises a plurality of physical qubits, each of the plurality of physical qubits having a respective controllable local bias term, and a plurality of physical qubit couplers, each of the physical qubit couplers couples a respective set of the physical qubits, each of the plurality of physical qubit couplers having a respective controllable coupling term, wherein a first number of the physical qubit couplers are operated as intra-logical qubit couplers where each of the first number of the physical qubit couplers have a respective coupling strength that couples a respective set of the physical qubits as a logical qubit, where each logical qubit represents a variable from a problem, and a second number of the physical qubit couplers are operated as inter-logical qubit couplers, wherein each of the second number of the physical qubit couplers have a respective coupling strength that controllably couples a respective group of the physical qubits, where the physical qubits in the respective group are part of different ones of the logical qubits and wherein at least two variables from the problem are assigned to two respective logical qubits, the computational system further including at least one processor-based device communicatively coupled to configure the at least one quantum processor may be summarized as including causing the at least one quantum processor to set each of the coupling terms of respective intra-logical qubit couplers to a value that provides a coupling strength that couples a respective set of the physical qubits as a logical qubit; causing the at least one quantum processor to set each of the coupling terms of the inter-logical qubit couplers to a target value relative to a first calibrated zero value; causing the at least one quantum processor to set each of the local bias terms to a second calibrated zero value; and calibrating the local bias terms for the qubits by, for each logical qubit, obtaining a number of samples via the at least one quantum processor; constructing an estimate of a population for the logical qubit using the obtained number of samples; determining whether the logical qubit exhibits a bias toward a basis state; and modifying the local bias term of at least one qubit forming the logical qubit upon determination that the logical qubit exhibits a bias toward a basis state to remove the bias.

In some implementations, each of the physical qubit couplers coupling a respective set or group of the physical qubits can be a physical qubit coupler coupling a respective pair of the physical qubits.

Modifying the local bias term of at least one qubit forming the logical qubit may include modifying the local bias term of each of the qubits forming the logical qubit upon determination that the logical qubit exhibits a bias toward a basis state to remove the bias. Modifying the local bias term of at least one qubit forming the logical qubit may include modifying the local bias term of each of the qubits forming the logical qubit by a bias adjustment value upon determination that the logical qubit exhibits a bias toward a basis state to remove the bias.

The method may further include iteratively calibrating the local bias terms until one or more criteria are met. For successive calibration iterations, the method may include modifying the local bias term of each of the qubits forming the logical qubit by a bias adjustment value less than a bias adjustment value used on a previous calibration iteration. Iteratively calibrating the local bias terms until one or more criteria are met may include iteratively calibrating the local bias terms until one or more of the following criteria are met: an elapsed calibration time, a number of calibration iterations, or a bias threshold.

The method wherein each of the plurality of qubits is superconducting below a critical temperature may further include maintaining the plurality of qubits at or below the critical temperature, the at least one processor-based device: initializing the at least one quantum processor in a first configuration embodying an initialization Hamiltonian; and evolving the quantum processor until the quantum system is described by a second configuration embodying a problem Hamiltonian.

The method may further include repeatedly initializing and evolving the at least one quantum processor for at least N iterations, where N>1; and repeatedly calibrating the local bias terms after at least one of the initialization and evolution iterations while the plurality of qubits are maintained at an operating temperature.

Calibrating the local bias terms may include calibrating the local bias terms after the plurality of qubits have had sufficient time to thermalize and arrive at a base temperature.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements are arbitrarily enlarged and positioned to improve drawing legibility. Further, the particular shapes of the elements as drawn are not necessarily intended to convey any information regarding the actual shape of the particular elements, and have been selected for ease of recognition in the drawings.

FIGS. 7A and 7B are graphs showing a measured coupling strength versus a requested coupling strength for a coupler of a quantum processor, without any correction for biases in the coupler.

FIGS. 7C and 7D are graphs showing a measured coupling strength versus a requested coupling strength for a coupler of a quantum processor, with correction for biases in the coupler, in accordance with the presently described systems, devices, articles, and methods.

DETAILED DESCRIPTION

Figure 1A:
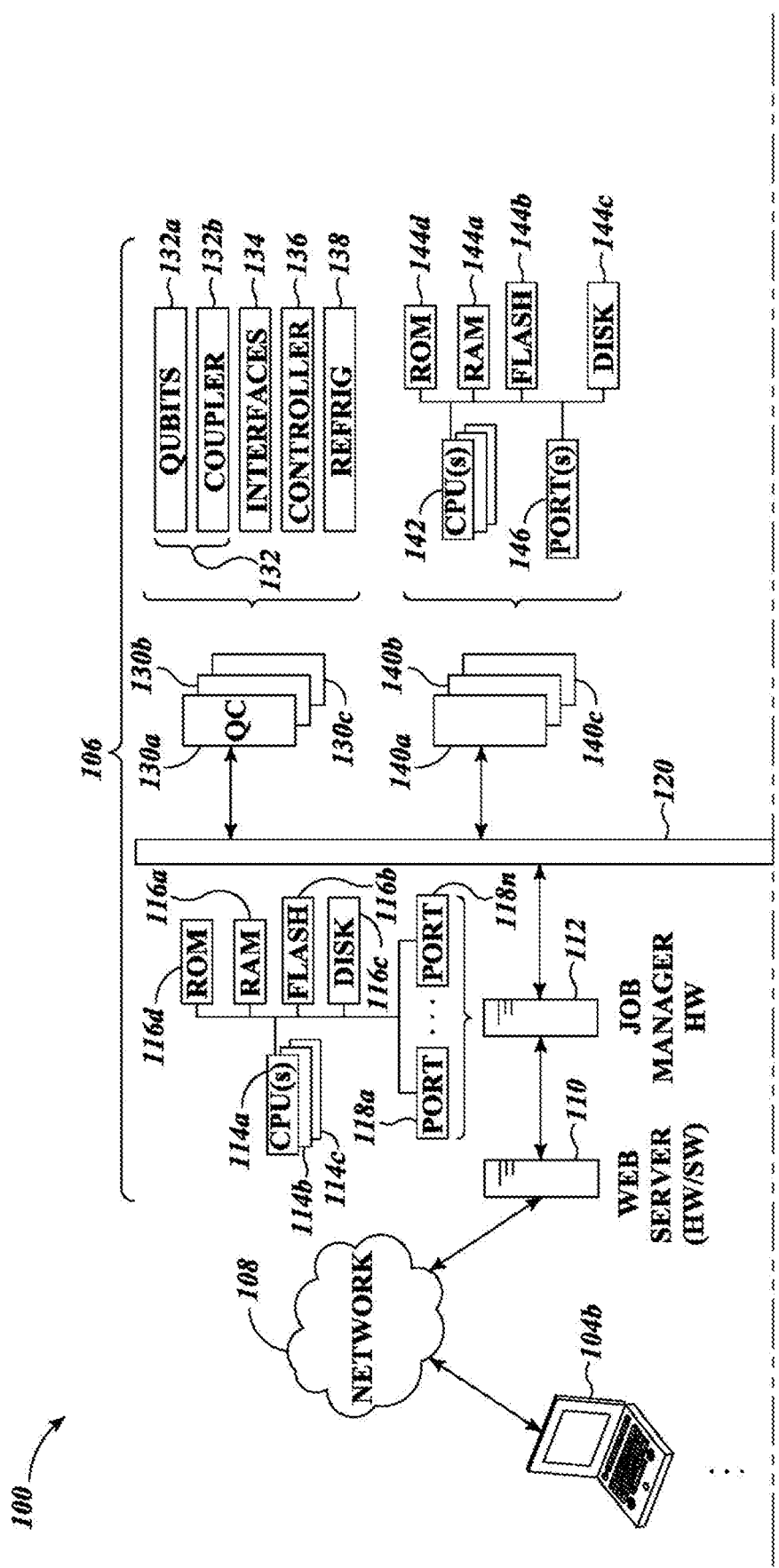
FIGS. 1A and 1B are schematic diagrams of an environment in which users may access a system via one or more networks, in accordance with the presently described systems, devices, articles, and methods, illustrating various hardware structures and interconnections therebetween.

In the following description, some specific details are included to provide a thorough understanding of various disclosed embodiments. One skilled in the relevant art, however, will recognize that embodiments may be practiced without one or more of these specific details, or with other methods, components, materials, etc. In other instances, well-known structures associated with digital processors, such as digital microprocessors, digital signal processors (DSPs), digital graphical processing units (GPUs), field programmable gate arrays (FPGAs), and/or application specific integrated circuits (ASICs); analog or quantum processors, such as quantum devices, coupling devices, and associated control systems including microprocessors, processor-readable nontransitory storage media, and drive circuitry have not been shown or described in detail to avoid unnecessarily obscuring descriptions of the embodiments of the invention.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment," or "an embodiment," or "another embodiment" means that a particular referent feature, structure, or characteristic described in connection with the embodiment is included in at least one embodiment. Thus, the appearances of the phrases "in one embodiment," or "in an embodiment," or "another embodiment" in various places throughout this specification are not necessarily all referring to the same embodiment. Furthermore, the particular features, structures, or characteristics may be combined in any suitable manner in one or more embodiments.

It should be noted that, as used in this specification and the appended claims, the singular forms "a," "an," and "the" include plural referents unless the content clearly dictates otherwise. Thus, for example, reference to a problem-solving system including "a quantum processor" includes a single quantum processor, or two or more quantum processors. It should also be noted that the term "or" is generally employed in its sense including "and/or" unless the content clearly dictates otherwise.

The headings provided herein are for convenience only and do not interpret the scope or meaning of the embodiments.

The various embodiments described herein provide systems and methods for interacting with quantum processors. More specifically, the various embodiments described herein provide systems and methods for reducing intrinsic/control errors (ICE).

As discussed herein, in order to realize a particular Ising spin glass instance on quantum processor, the parameters $h_i$ and $J_{ij}$ used in a problem Hamiltonian may need to be translated into flux biases that are to be applied to devices on chip. The translation process may involve inverting a calibrated model of device response versus flux bias in order to determine the required bias. Systemic errors (e.g., in the calibrated qubit persistent current) or time dependent fluctuations (e.g., low frequency noise, 1/f noise, pink noise, electronics drift) may introduce errors in the representation of the problem Hamiltonian. Implementations described herein provide a comprehensive and efficient procedure to correct the calibration of a quantum processor to correct or reduce these errors over extended processor operation. The implementations described below provide specifically crafted, simple optimization problems that can be run on a working graph of a quantum processor. The output of these problems provides information useful in repairing some sources of intrinsic/control errors. This is in contrast to calibration procedures that are run or executed on only one or two qubits at a time, which suffer from small systematic errors, and are only performed immediately after cooling the quantum processor to its operational temperature. Previously, any drift in the quantum processor would degrade the performance of the quantum processor.

Intrinsic/Control Error (ICE)

An ideal flux qubit can be described by a Hamiltonian like:

$$\mathcal{H}_q = -\tfrac{1}{2}[\epsilon_q \sigma_z + \Delta_q \sigma_x]$$

where $$\epsilon_q = 2|I_q^p|(\Phi_q^x - \Phi_q^0)| \quad (6)$$

with $\Phi_q^x$ defined as the external flux bias threading the qubit body, $\Delta_q$ is the tunneling energy, and $\sigma_z$ and $\sigma_x$ are Pauli matrices. Solving this eigen-system for the ground state $|\varphi_g\rangle$ and calculating the expectation value of the persistent current operator $\hat{I}_q^p \equiv |I_q^p|\sigma_z$ yields:

$$\langle \varphi_g | \hat{I}_q^p | \psi_g \rangle = |I_q^p| \frac{\epsilon_q}{\sqrt{\epsilon_q^2 + \Delta_q^2}}. \quad (7)$$

The ideal flux qubit model given by equation 7 is inadequate as it does not capture a linear background. The linear background is due to a subtle shift of the local minima of the rf-SQUID potential as a function of $\Phi_q^x$. This effect becomes more pronounced if the net capacitance across the CCJJ (i.e., compound-compound Josephson junction) structure of the flux qubit is large. Such data are better described by an expectation value of the form:

$$\langle \psi_g | \hat{I}_q^p | \psi_g \rangle = |I_q^p| \frac{\epsilon_q}{\sqrt{\epsilon_q^2 + \Delta_q^2}} + \chi_q(\Phi_q^x - \Phi_q^0) \quad (8)$$

where $X_q$ is a first order paramagnetic susceptibility (with units of $H^{-1}$) that captures the motion of the minima of the rf-SQUID potential as a function of $\Phi_q^x$. As such, the definition of the persistent current operator for a single isolated non-ideal rf-SQUID flux qubit may be modified in the following manner:

$$\hat{I}_q^p \equiv |I_q^p|\sigma_z \rightarrow |I_q^p|\sigma_z + X_q(\Phi_q^x - \Phi_q^0). \quad (9)$$

This new definition of the persistent current operator allows for smooth interpolation between the behavior of an rf-SQUID flux qubit and an rf-SQUID coupler by adjusting the magnitudes of $|I_q^p|$ and $X_q$. This naturally occurs during quantum annealing as $|I_q^p|$ monotonically grows as the annealing parameter $\Gamma(t)$ evolves from t=0 to t=$t_f$ in the Hamiltonian given by equation 3a for this type of rf-SQUID flux qubit. Consequently, there is no clear dividing line between qubit and coupler as a function of rf-SQUID tunnel barrier height; both behaviors are achieved with essentially differing proportions during the course of quantum annealing.

In inductively coupled network of non-ideal rf-SQUID flux qubits, the total flux impinging upon any given qubit is no longer simply the externally applied flux $\Phi_q^x$ relative to the degeneracy point $\Phi_q^0$. A flux operator that embodies the states of the qubits to which the qubit is coupled may be defined. The total flux threading qubit q coupled to other qubits, indexed by i, may be given by:

$$\hat{\Phi}_q^{total} = \Phi_q^x - \Phi_q^0 + \sum_{i \neq q} M_{iq}(|I_i^p|\sigma_i^{(z)} + \chi_i \hat{\Phi}_i^{total}). \quad (10)$$

Updating equation 9 accordingly yields:

$$\hat{I}_q^p \equiv |I_q^p|\sigma_q^{(z)} \rightarrow |I_q^p|\sigma_q^{(z)} + X_q \hat{\Phi}_q^{total}. \quad (11)$$

Therefore, the flux threading any one qubit self-consistently depends upon the flux threading all other qubits. This, then, may impact the target Hamiltonian given by equation 3a. Substituting flux qubit parameters into that expression yields:

$$\mathcal{H} = -\frac{1}{2}\sum_q [2|I_q^p|(\Phi_q^x - \Phi_q^0)\sigma_q^{(z)} + \Delta_q \sigma_q^{(x)}] + \sum_{q,q'>q} J_{qq'}\sigma_q^{(z)}\sigma_{q'}^{(z)} \quad (12)$$

As shown in equation 12, $X_q$ may have no impact on the system Hamiltonian. However, careful attention may be needed when calculating $J_{qq'}$ from device parameters. The calculation may be readily performed to first order in $X_q$ and then justify this truncation by correctly identifying the dimensionless perturbative parameter as given below:

$$\hat{J}_{qq'} \equiv M_{qq'} \hat{I}_q^p \hat{I}_{q'}^p \quad (13)$$

$$= M_{qq'}(|I_q^p|\sigma_q^{(z)} + \chi_q \hat{\Phi}_q^{total})(|I_{q'}^p|\sigma_{q'}^{(z)} + \chi_q \hat{\Phi}_{q'}^{total})$$

$$\approx M_{qq'}|I_q^p|^2\sigma_q^{(z)}\sigma_{q'}^{(z)} + M_{qq'}|I_q^p|\chi_q(\Phi_{q'}^x - \Phi_{q'}^0)\sigma_q^{(z)} +$$

$$M_{qq'}|I_q^p|\chi_q(\Phi_q^x - \Phi_q^0)\sigma_{q'}^{(z)} +$$

$$M_{qq'}|I_q^p|^2\chi_q\left[\sum_{i \neq q}M_{iq}\sigma_i^{(z)}\sigma_{q'}^{(z)} + \sum_{i \neq q'}M_{iq'}\sigma_i^{(z)}\sigma_q^{(z)}\right] + O(\chi_q^2)$$

The final line of equation 13 contains five terms that are up to first order in $X_q$. The first term on the right side, $M_{qq'}|I_q^p|^2\sigma_q^{(z)}\sigma_{q'}^{(z)}$, is the zeroth order in $X_q$ inter-qubit coupling. The second and third terms are linear in qubit z operators (i.e., diagonal terms), which mean they are related to $\epsilon_q$ and $\epsilon_0$, respectively. The first of these terms arises from the external flux bias in qubit q', $\Phi_{q'}^x$, driving a persistent current that is proportional to $X_q$ that is then mediated across the coupler into qubit q. The second of these terms arises from the reverse effect. The result is that finite $X_q$ allows external qubit fluxes to bleed across couplers. The fourth and fifth terms in the result are second order in qubit z operators, which indicates that they are additional inter-qubit couplings. None of these terms involve $\sigma_q^{(z)}\sigma_{q'}^{(z)}$. Rather, they all represent couplings between qubit i≠q(q') and qubit q(q'), as mediated through qubit q'(q). These higher order couplings result from the residual coupler-like behavior of the non-ideal flux qubits, and the signal propagates from qubit i through an effective coupler composed of $M_{iq} \rightarrow$ qubit $q \rightarrow M_{qq'}$ to reach qubit q'. The effective mutual inductance of this higher order coupling is $M_{iq}*X_q*M_{qq'}$.

Qubit background susceptibility leads to distortion of the local biases in the Hamiltonian given in equation 3a. According to equation 13, one must modify the definition of the qubit bias energies to account for the bleeding of external flux biases:

$$\epsilon_q \rightarrow 2|I_q^p|\left[\Phi_q^x - \Phi_q^0 - \sum_{i \neq q} M_{iq}\chi_q(\Phi_i^x - \Phi_q^0)\right] \quad (14)$$

This may move qubit biases off-target and therefore impact h-terms in problem Hamiltonians. Assuming that all $\Phi_q^x - \Phi_q^0$ are persistent current compensation signals of the form given by equation 3e and substituting equation 14 into equation 3b yields $$h_q \rightarrow h_q - M_{AFM}\chi_q \sum_{i \neq q} J_{iq}h_i. \quad (15)$$

If the range of interqubit couplings is restricted, as it is in some implementations, to within $-1 \leq J_{ij} \leq +1$ and local biases to within $-1 \leq h_i \leq 1$, the magnitude of the intrinsic errors imparted by $X_q$ will be $|\delta h_q| \leq M_{AFM} * X_q$ per interqubit coupling.

Qubit background susceptibility may also distort the J-terms in the Hamiltonian of equation 3a. For an arbitrary processor topology, $$\mathcal{J}_{qq'} \rightarrow M_{qq'}|I_q^p|^2 + \sum_{i \neq (q,q')} M_{iq}\chi_q M_{iq'}|I_q^p|^2 \qquad (16)$$

Thus, the net coupling between qubits q and q' is the sum of the intended direct coupling $M_{qq'}$, plus the indirect paths mediated across all other qubits $i \neq \{q, q'\}$. Translating into problem Hamiltonian specification, equation 16 may become:

$$J_{qq'} \rightarrow J_{qq'} - M_{AFM} \chi_q \sum_{i \neq \{q,q'\}} J_{iq} J_{iq'}. \qquad (17)$$

If the range of inter-qubit couplings are restricted to within 1, then the magnitude of the intrinsic errors imparted by $X_q$ may be $|\delta J_{qq'}| \leq M_{AFM} * X_q$ per mediated coupling. The number of terms in the sum in equation 17 may depend on the processor topology. For example, for a 6-connected processor qubits, that number may be 4.

Given equations 15 and 17, the truncation of equation 13 to first order in $X_q$ may now be justified. For example, if the terms to higher orders in $X_q$ alluded to in equation 13 contain dimensionless quantities of the form $(M_{AFM} * X_q)^n \ll 1$ for $n \geq 2$, then they may be safely neglected.

The dominant non-ideality of an rf-SQUID flux qubit may be a faint whisper of coupler-like behavior due to the background linear susceptibility $X_q$. In contrast, rf-SQUID interqubit couplers may be designed to provide a linear response to external flux. The dominant non-ideality of an rf-SQUID coupler may be a weak qubit-like response on top of a linear susceptibility $X^{(1)}$. When properly designed and operated, this weak qubit-like response may become manifested through a third-order susceptibility $X^{(3)}$. The coupling energy between qubits i and j may be expressed as:

$$\mathcal{J}_{ij} = (M_{ql}M_{qr}X^{(1)}|I_q^p|^2 + \tfrac{1}{3}M_{ql}^3 M_{qr} X^{(3)}|I_q^p|^4 + \tfrac{1}{3}M_{ql}M_{qr}^3 X^{(3)}|I_q^p|^4)\sigma_i^z \sigma_j^z \qquad (18)$$

where $M_{ql}$ and $M_{qr}$ represent the transformer mutual inductances between the coupler body and the qubits to the left (l) and right (r), respectively. Translating into problem Hamiltonian specification:

$$J_{ij} \rightarrow J_{ij}\left[1 + \frac{X^{(3)}|I_q^p|^2}{3X^{(1)}}(M_{ql}^2 + M_{qr}^2)\right] \qquad (19)$$

If the range of inter-qubit couplings is restricted to within $-1 \leq J_{ij} \leq 1$, then the magnitude of the intrinsic errors imparted by $X^{(3)}$ may be:

$$|\delta J_{ij}| \leq (M_{ql}^2 + M_{qr}^2)X^{(3)}|I_q^p|^2/3X^{(1)}. \qquad (20)$$

Low frequency flux noise may give rise to an uncertain amount of flux in the qubit body, which may then result in an error in the problem parameter $h_i$. Fabricating all other closed inductive loops such that they are sufficiently small may make the low frequency flux noise to be negligible, as described in, for example Lanting et al., "Geometrical dependence of low frequency noise in superconducting flux qubits" Phys. Rev. B, Vol. 79, 060509, 2009 ("Lanting").

Using room temperature current sources during calibration and operation may help realize multiple independently tunable flux biases on a quantum processor. However, control errors may still be imparted by bias line noise of which the most important error mechanism may be on-chip crosstalk. Crosstalk may be defined as a mutual inductance between an external current bias line and an unintended target loop. For example, if an analog bias carries a time-independent signal, then crosstalk from that line may lead to time-independent flux offsets in unintended target loops. If each such loop is equipped with a flux DAC, it may be possible to apply compensation signals. The most significant time-dependent crosstalk may be those arising from the CCJJ analog bias that drives quantum annealing process. Crosstalk into CJJ (compound Josephson junction) loops may lead to time-dependent variation of the critical currents of those structures, which may then alter the qubit persistent current $|I_q^p|$ and the qubit degeneracy point $\Phi_q^0$. These mechanisms may then give rise to errors in the problem settings $h_i$ and $J_{ij}$. Likewise, crosstalk into the qubit body may lead to an error in the problem setting $h_i$.

In order to realize a particular Ising spin glass instance on quantum processor, the parameters $h_i$ and $J_{ij}$ used in the Hamiltonian of equation 3a may need to be translated into flux biases that are to be applied to devices on chip. The translation process may involve inverting a calibrated model of device response versus flux bias in order to determine the required bias. The result of such a calculation may then determine the required flux DAC settings. For example, if a desired flux bias to within ±half of the LSD (least significant digit) weight may be realized for a particular target loop, the resulting roundoff error may then manifest as a control error.

It is important to recognize that a single numerical value may not be ascribed to a particular ICE (Intrinsic/Control Error) mechanism as the qubit parameters $|I_q^p|$, $\Delta_q$, and $X_q$ may all change with annealing bias $\Phi_{CCJJ}^x$. This may have serious implications for the magnitude of ICE as annealing progresses, for example with quantum annealing starting at $\Phi_{CCJJ}^x/\Phi_0 = 0.5$ and ending at $\Phi_{CCJJ}^x/\Phi_0 = 1$. However, there may be a narrow domain in $\Phi_{CCJJ}^x$ over which most of the critical system dynamics occur and therefore focus may be given therein. The details of the processor dynamics may strongly depend on the particular Ising spin glass instance that has been programmed into the hardware. However, the narrow domain of $\Phi_{CCJJ}^x$ may be roughly identified using the following:

1. An infinitely long 1-dimensional quantum Ising spin chain may exhibit quantum criticality when $\Gamma_i(t) = 1$ in the Hamiltonian of equation 3a. Using equation 3d, this condition may be satisfied when $\Delta_q = 2J_{AFM}$.

2. For an isolated single qubit that is subject to quantum annealing, as the tunnel barrier is raised in ramping from, for example, $$\Phi_{CCJJ}^x/\Phi_0 = 0.5 \text{ to } \Phi_{CCJJ}^x/\Phi_0 = 1, \qquad (21)$$

the qubit may be free to tunnel between the two localized spin states provided the tunnel dynamics are sufficiently fast. Eventually, the tunneling energy may become exponentially suppressed with increasing tunnel barrier height and the state of the qubit may become localized. The state of the qubit may then be effectively sampled at some intermediate annealing bias $0.5 < \Phi_{CCJJ}^x/\Phi_0 < 1$.

Any ICE mechanism that may impact qubit persistent current or degeneracy point may need to be studied over the domain of annealing bias $\Phi_{CCJJ}^x$ that is relevant for quantum annealing. Any ICE mechanism that may impact a tunable mutual inductance may need to be studied over the operating range of that coupling device, be it a persistent current compensator (IPC) or inter-qubit coupler (CO). IPCs are described in, for example, US Patent publication 2011-0060780.

Calibrating $\Phi_q^0$ using a fast single qubit annealing measurement that samples the state of the qubit at for example, $\Phi_{CCJJ}^x/\Phi_0 = 0.71$ may make a quantum processor become sensitive to shifts in $\Phi_q^0$ relative to the calibrated quantity. The dominant ICE mechanisms that may give rise to errors in $h_i$ in quantum processor are low frequency flux noise in the qubit body $\Phi_q''$, qubit non-ideality $X_q$, and CJJ-DAC LSD (least significant digit) weight influencing the qubit degeneracy point $\Phi_q^0$. Other such notable mechanisms are the analog bias crosstalk CCJJ→QFB and CCJJ→CJJ. Low frequency flux noise may be addressed through materials research and improved fabrication. Further improvements in fabrication may also reduce the errors attributed to CJJ-DAC LSD weight. Since the response of the CJJ loops may become increasingly nonlinear at larger bias, the control error imposed by finite CJJ-DAC LSD weight may be aggravated. If the spread in Josephson junction critical current were reduced to for example +1%, then much of the problem may be remedied by choosing smaller pre-biases for the CJJ loops. Through improved on-chip magnetic shielding designs, magnitude of analog bias crosstalks may be significantly reduced.

The dominant $\delta J_{ij}$ error mechanisms for a quantum processor may be qubit non-ideality, CJJ-DAC LSD weight influencing the qubit persistent current, and CCJJ-DAC LSD weight. As previously described, issues related to CJJ-DAC LSD weight may be resolved by improvements in fabrication which would then facilitate choosing less aggressive pre-biases for the CJJ loops. The CCJJ-DAC LSD weight may be adjusted in revisions of the quantum processor through careful design work or redesigning the processor. Furthermore, control errors in CO-DAC LSD weight (i.e., coupler-DAC LSD weight) may be alleviated through rework of coupler parametric designs.

For example, consider a phenomenological function of the form $\delta = C^* N^{-\alpha}$ where C is a numerical prefactor related to the processor topology and N is the graph size. If each realized instance parameter $h_i + \delta h_i$ and $J_{ij} + \delta J_{ij}$ has an error that is independent and Gaussian distributed around its target value $h_i$ and $J_{ij}$, respectively, then the energy $E_m$ of each state m may increase or decrease linearly with $\delta h_i$ and $\delta J_{ij}$. Therefore, the deviations in the instance eigen spectrum may also possess Gaussian distributions over all noise instances. On average, the energy of the $m^{th}$ energy level, $E^m$, may be expected to move randomly with respect to the $n^{th}$ energy level, $E_n$, when viewed over all possible noise instances. Assuming that all $\delta h_i$ and $\delta J_{ij}$ are independent, the mean change in energy of any one level $\delta E$ may be found by adding all of the perturbations in quadrature, which may then yield $\delta E \sim C\sqrt{(N^*\delta)}$. The probability of interchanging any two energy levels (for example, swapping a ground state and a first excited state) and thus the probability of solving the correct problem may then be related to the overlap of two Gaussian shifted energy level probability distributions. Taking the energy spacing between the unperturbed neighboring energy levels to be A and assigning a width $\delta E$ to the probability distribution versus energy for each level, this probability may be shown to be $\propto \exp\{-A^2/4^*(\delta E)^2\}$. Thus, in order to maintain a constant probability of solving the wrong problem with increasing graph size, $\delta E$ may need to be kept constant/may need to be maintained. For $\alpha=0.5$, the errors $h_i$ and $J_{ij}$ may need to be decreased by a factor of 2 for every factor of 4 increase in number of qubits. As such, for a one million qubit processor, this may mean decreasing $\alpha=0.5$ by a factor of 44 to yield $\delta=0.001$.

The present systems and methods taught herein may provide, among other things, techniques for improving the hardware graph (i.e., the arrangement of qubits in a quantum processor), enlarging the working graph for a given hardware graph, reducing ICE, reducing thermally-assisted noise and encoding the problem for error correction for improving the performance of a quantum processor.

Adopting encoding strategies to further counter the influence of temperature in a large-scale quantum annealing processor may also allow for improving the performance of the quantum processor. Such encoding techniques may be referred to "error correction."

Sources of error may be divided into two categories: static and dynamic. Static sources may be quench errors that make the final Hamiltonian different from the desired target Hamiltonian. If the ground state of the modified Hamiltonian is different from that of the target Hamiltonian, then the hardware will return a wrong solution even if it succeeds in finding a ground state. All of the ICE mechanisms described previously may fall into this category. Dynamical error sources may be those that cause the system to leave the ground state during quantum annealing. In this case, the system may not return the correct solution even if the final Hamiltonian is on target. Thermal activation and the physics of Landau-Zener transitions at small gap anticrossings fall into this latter category.

Quantum annealing is inherently a stochastic method. As such, there may be a non-zero probability of error in any calculation. If the probability of success in a single repetition of the QA methods is $P_{success}$, then the probability $P_k$ of observing at least one success after k repetitions may be $$P_k = 1 - (1 - P_{success})_k. \quad (22)$$

Solving for the number of iterations k then yields $$k = \frac{\ln(1 - P_k)}{\ln(1 - P_{success})}. \quad (23)$$

Therefore, $P_k$ may be made arbitrarily close to 1 by repetition, when a success criterion is at hand in order to verify trial solutions returned by the quantum annealing processor. However, small $P_{success}$ may lead to a very large k, thus rendering quantum annealing inefficient. Therefore, augmenting $P_{success}$ may be prudent, but repetition means that quantum annealing need not achieve $P_{success}=1$ in order to be useful.

Quantum annealing may be used in conjunction with post-processing by classical search methods. If a system becomes localized in an excited state and that state is relatively few spin flips (i.e., small Hamming distance) from a ground state, then a local search may be an efficient means to recover from such an error. Doing so may also be an effective means of correcting for statistically infrequent processor readout errors. However, as with thermal relaxation, if those excited states are many spin flips (i.e., larger Hamming distance) from a ground state, then post-processing may not be efficient.

In general, there may be different ways to pose a given optimization problem as an Ising spin glass Hamiltonian. Ideally, all of these Hamiltonians may be equivalent and may lead to the same solutions. In practice, however, because of static errors, the final Hamiltonians that are realized on the processor may be different. For some of these Hamiltonians, the effect of the errors may be large enough to completely change the ground state. By examining multiple different yet equivalent Hamiltonians, the chance that at least one of these Hamiltonians is sufficiently on target may be increased so as to provide a correct ground state.

Reassigning the problem variables to different combinations of qubits on the processor may result in a new embedding. For example, by applying a sequence of permutations to a given embedding to generate a new embedding on a functional quantum processor and by running the same problem on the hardware with different embeddings, a large number of combinations of static errors may be sampled over to find the optimal solution to the original problem. Such techniques are discussed in, for example, US Patent Publication 2012-0023053.

A change of variables technique may also be used to change problem Hamiltonians. For example, for the problem energy functional given below:

$$E(s) = \sum_i h_i s_i + \sum_{i,j>i} J_{ij} s_i s_j \qquad (24)$$

applying the transformation: $s_i \to s'_i = \alpha_i * s_i$, where $\alpha_i = \pm 1$ to write $$E(s') = \sum_i h'_i s'_i + \sum_{i,j>i} J'_{ij} s'_i s'_j \qquad (25)$$

by choosing $$h'_i = \alpha_i * h_i; \quad J'_{ij} = \alpha_i * \alpha_j * J_{ij} \qquad (26)$$

makes equations 24 and 25 become equivalent. Therefore, equation 25 with the changed variables and associated parameters of equation 26 may solve the same problem. A set of $\{\alpha_i\}$ may be picked randomly and hardware may be run to obtain $\{S'_i\}$. In other words, in order to generate instances with changed variables, a set of qubits in the quantum processor may be randomly flipped and for each instance, the probability of finding a ground state $P_{success}$ may be recorded. The actual solution to the original problem may be obtained by the inverse transformation: $s_i = \alpha_i * s'_i$. The probability of finding the solution may be increased by repeating quantum annealing for many different changes of variables.

Encoding a single logical qubit into a number of physical qubits may help reduce both static and dynamic errors. Encoding may be accomplished by, among other things, ferromagnetically coupling a small number of physical qubits to each other so that they globally represent one logical variable (logical qubit). Such logical qubits are described in, for example, U.S. Pat. No. 8,174,305. Majority rule may be used to decide the state of the logical qubit after readout. This way, static or dynamic errors that may cause flipping of a small number of physical qubits (minority within a logical qubit) may be corrected.

Encoding may also reduce ICE by distributing problem parameters over the physical qubits. For example, suppose due to ICE, the hardware allows the (unnormalized) bias applied to the $i^{th}$ qubit to only have 2n+1 integer values: $h_i=0, \pm 1, \ldots, \pm n$. Now, if a logical qubit is encoded using m physical qubits, then the effective bias $h_i^{eff}$ applied to the logical qubit is the sum of all biases applied to the physical qubits within the logical qubit. Therefore, the effective bias can range from $-nm$ to $nm$, with 2 nm+1 possible values, which is larger than before. This leads to finer control of the value of $h_i^{eff}$ compared to the normalized $h_i$ that would be applied to a single qubit.

When the parameters are subject to random static errors, encoding may increase the signal to noise ratio. As described above, the range of the effective bias $h_i^{eff}$ is increased with the number of qubits within a logical qubit $\propto m$. If a random error with the standard deviation $\delta$ is added to the bias applied to each physical qubit within a logical qubit, then the overall error that the logical qubit sees may have a standard deviation equal to $\sqrt{(m\delta)}$. Therefore, the signal to noise ratio may be improved by a factor of $\sqrt{m}$.

Encoding may reduce dynamic errors by increasing the effective energy scale. Increasing the energy scale of a Hamiltonian may reduce errors by increasing the size of the minimum gap and also by reducing the thermal excitation probability via increasing the exponents in the Boltzmann factor $e^{-(E/k_B T)}$. Both of these effects are exponential and therefore small increases in the energy scale may lead to a large gain in probability of success. With reference to the above example, if one logical qubit can be coupled to a neighboring logical qubit via k physical qubits, the effective coupling between the two logical qubits may be the sum of the k couplings. Therefore, the maximum coupling energy may be enhanced by a factor of k. If the bias energy is also enhanced by the same factor, the total energy scale of the problem Hamiltonian may be effectively enhanced, which may lead to smaller dynamic errors.

A closed quantum system that encounters an exponentially small gap anticrossing between its two lowest eigenstates may require an exponentially long annealing time in order to stay in the ground state. At large scales, it is expected that small gap anticrossings may become a major source of dynamic error. An open quantum system may benefit from thermal noise by exciting the system to the first excited state before the anticrossing and therefore reaching the final ground state via adiabatic crossing.

Some types of anticrossings may be removed by changing the annealing path. These types of anticrossings may be referred to as perturbative crossings which may occur when an eigenstate that corresponds to a superposition of a group of local minima of the problem Hamiltonian crosses the eigenstate that corresponds to the superposition of the global minima, as described in, for example, Amin et al., "First-order quantum phase transition in adiabatic quantum computation" Phys. Rev. A, Vol. 80, Issue 6, 062326, 2009 ("Amin 2009"). The minimum gap may be exponentially related to the Hamming distance between the global and local minima. Therefore, for large Hamming distances, the minimum gap may become exponentially small. These anticrossings are very sensitive to the system parameters and may be avoided by changing the annealing path.

The time-dependent quantum annealing Hamiltonian of equation 3a may be written as:

$$H = \mathcal{J}_{AFM}(t) \mathcal{H}_P - \frac{1}{2} \sum_i \Delta_i(t) \sigma_i^x \qquad (27)$$

where $H_P$ is the dimensionless problem Hamiltonian. Quantum annealing involves simultaneously increasing $J_{AFM}(t)$ and decreasing all $\Delta_i(t)$ until the latter vanish. It is assumed that all $\Delta_i$ are uniform. This may be realized in quantum annealing processor by ramping a single annealing bias that is applied to all qubits. For this particular physical implementation of quantum annealing, there may only be a single bias, namely $\Phi_{CCJJ}^x(t)$, that simultaneously controls both $J_{AFM}(t)$ and $\Delta_i(t)$, which may lead to a particular so-called annealing path.

If, for example, for a given Ising spin glass instance, the particular annealing path that has been implemented in a quantum processor happens to encounter a small gap perturbative crossing, then a dynamic error may occur in every repetition of quantum annealing. However, there may be many different paths that reach the same final Hamiltonian if $\Delta_i$ is allowed to be non-uniform. A random change of the annealing path may not always be the most efficient way of solving the problems, especially if there are many anticrossings that need to be removed. Any random change of $\Delta_i$ may remove some of the anticrossings, but bring in other anticrossings in the way.

Rather than using random changes in $\Delta_i(t)$, values of $\Delta_i(t)$ may be adaptively changed based on the failures of previous iterations of quantum annealing. Every time the system makes adiabatic crossing, it may end up in an excited state that is a superposition of many local minima. These local minima may be sampled and then changes may be implemented to a particular $\Delta_i(t)$ in such a way that the system may readily tunnel from those minima during quantum annealing.

Throughout this specification and the appended claims, the term "logical qubit" is used to describe a collection of communicatively coupled qubits that act as a single qubit. This collection may be described as a chain, sequence, series, or set. In other words, a chain of communicatively coupled qubits that may collectively represent a single variable of a problem may be referred to as a logical qubit. Therefore, a logical qubit may comprise more than one physical qubit. However, a chain of communicatively coupled qubits may not always be a logical qubit as the individual physical qubits in the chain of physical qubits may represent different variables of a problem. When a chain of physical qubits are programmed to represent a single variable such that the chain of physical qubits collectively act as a single logical qubit, that chain of physical qubits may then be called a logical qubit. According to the present systems and methods, a logical qubit may at least be formed by communicatively coupling a first qubit to a second qubit such that the first qubit and the second qubit collectively behave as one qubit.

The various embodiments described herein provide systems and methods for reducing errors and thereby improving the performance of a superconducting quantum processor. As an illustrative example, a superconducting quantum processor designed to perform quantum annealing is used in the description that follows. However, a person of skill in the art will appreciate that the present systems and methods may be applied to any form of quantum processor hardware implementing any form of quantum algorithm(s) (e.g., adiabatic quantum computation, quantum annealing, gate/circuit-based quantum computing, etc.).

In accordance with some embodiments of the present systems, devices, articles, and methods, a quantum processor may be designed to perform quantum annealing. An evolution Hamiltonian is proportional to the sum of a first term proportional to the problem Hamiltonian and a second term proportional to the delocalization Hamiltonian. As previously discussed, a typical evolution may be represented by equation 28:

$$H_E \propto A(t)H_D + B(t)H_P \quad (28)$$

where $H_P$ is the problem Hamiltonian, delocalization Hamiltonian is $H_D$, $H_E$ is the evolution or instantaneous Hamiltonian, and A(t) and B(t) are examples of an evolution coefficient which controls the rate of evolution. In general, evolution coefficients vary from 0 to 1. In some embodiments, a time varying envelope function is placed on the problem Hamiltonian. A common delocalization Hamiltonian is shown in equation 29:

$$H_D \propto -\frac{1}{2}\sum_{i=1}^{N} \Delta_i \sigma_i^x \quad (29)$$

where N represents the number of qubits, $\sigma_i^x$ is the Pauli x-matrix for the $i^{th}$ qubit and A is the single qubit tunnel splitting induced in the $i^{th}$ qubit. Here, the $\sigma_i^x$ terms are examples of "off-diagonal" terms. A common problem Hamiltonian includes first component proportional to diagonal single qubit terms and a second component proportional to diagonal multi-qubit terms. The problem Hamiltonian may be of the form similar to that of equation 3a. The problem Hamiltonian, for example, may be of the form:

$$H_P \propto -\frac{\varepsilon}{2}\left[\sum_{i=1}^{N} h_i \sigma_i^z + \sum_{j>i}^{N} J_{ij}\sigma_i^z \sigma_j^z\right] \quad (30)$$

where N represents the number of qubits, $\sigma_i^z$ is the Pauli z-matrix for the $i^{th}$ qubit, $h_i$ and $J_{i,j}$ are dimensionless local fields for the qubits, and couplings between qubits, and $\varepsilon$ is some characteristic energy scale for $H_P$. Here, the $\sigma_i^z$ and $\sigma_i^z \sigma_j^z$ terms are examples of "diagonal" terms. The former is a single qubit term and the latter a two qubit term. Throughout this specification, the terms "problem Hamiltonian" and "final Hamiltonian" are used interchangeably. Hamiltonians such as $H_D$ and $H_P$ in equations 29 and 30, respectively, may be physically realized in a variety of different ways. A particular example is realized by an implementation of superconducting qubits.

Examples of superconducting qubits include superconducting flux qubits, superconducting charge qubits, and the like. In a flux qubit the Josephson energy dominates or is equal to the charging energy. In a charge qubit it is the reverse. Examples of flux qubits that may be used include rf-SQUIDs, which include a superconducting loop interrupted by one Josephson junction, persistent current qubits, which include a superconducting loop interrupted by three Josephson junctions, and the like. See, examples of rf-SQUID qubits in Bocko, et al., 1997, *IEEE Trans. on Appl. Supercond.* 7, 3638; Friedman, et al., 2000, Nature 406, 43; and Harris, et al., 2010, *Phys. Rev. B* 81, 134510; or persistent current qubits, Mooij et al., 1999, *Science* 285, 1036; and Orlando et al., 1999, *Phys. Rev. B* 60, 15398. In addition, hybrid charge-phase qubits, where the energies are equal, may also be used. Further details of superconducting qubits may be found in Makhlin, et al., 2001, *Rev. Mod. Phys.* 73, 357; Devoret et al., 2004, arXiv:cond-mat/0411174; Zagoskin and Blais, 2007, *Physics in Canada* 63, 215; Clarke and Wilhelm, 2008, *Nature* 453, 1031; Martinis, 2009, *Quantum Inf. Process.* 8, 81; and Devoret and Schoelkopf, 2013, *Science* 339, 1169. In some embodiments, the qubit is controlled by on chip circuitry. Examples of on-chip control circuitry can be found in U.S. Pat. Nos. 7,876,248; 7,843,209; 8,018,244; 8,098,179; and 8,169,231.

Figure 1B:
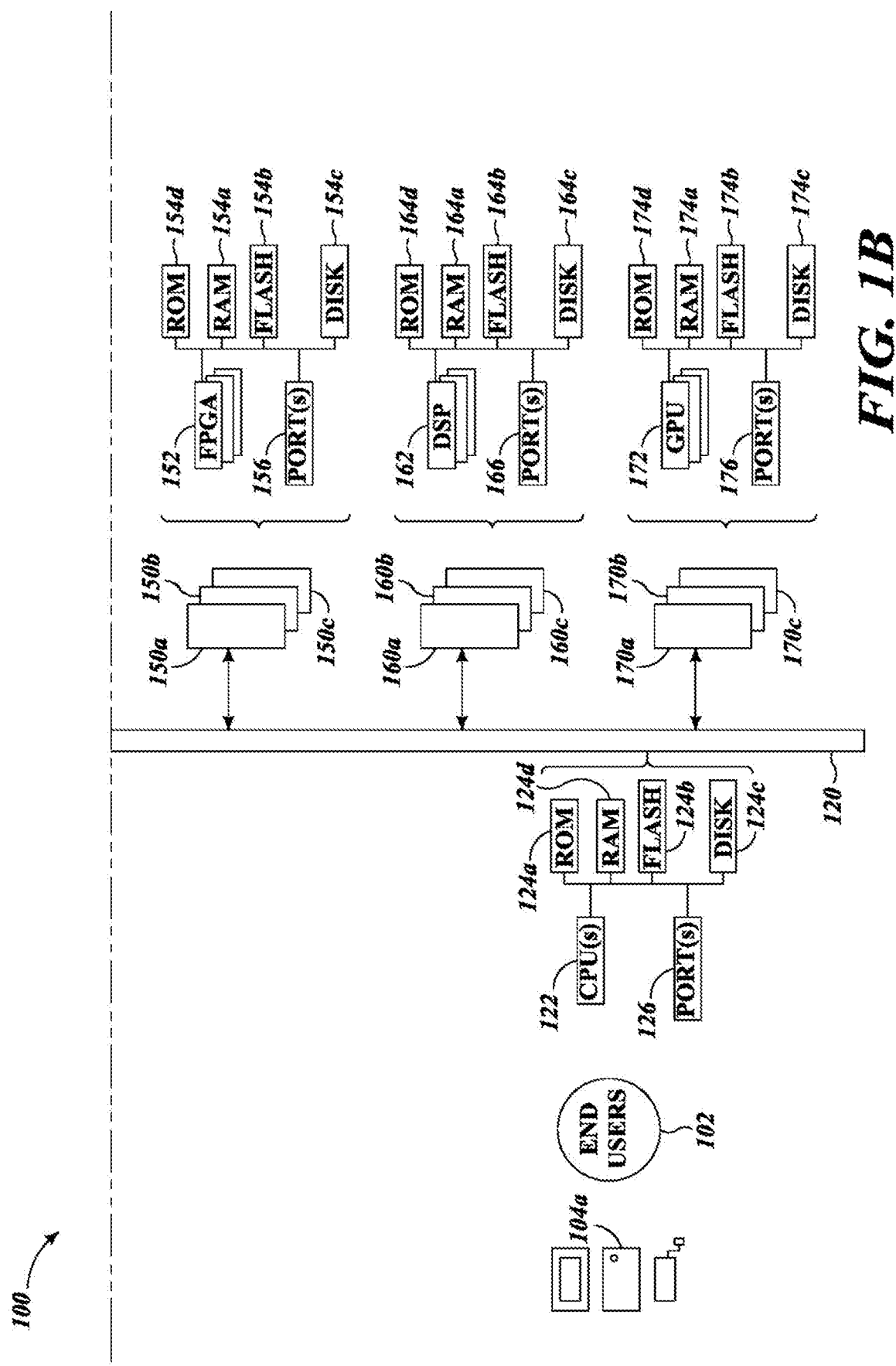

FIGS. 1A and 1B show an exemplary networked environment 100 in which a plurality of end users 102 (only one shown) operate end user processor-based devices 104a-104n (collectively 104) to access a computational system 106 via one or more communications channels such as networks 108, according to the presently described systems, devices, articles and methods.

The end user processor-based devices 104 may take any of a variety of forms, for example including desktop computers or workstations 104a, laptop computers 104b, tablet computers (not shown), netbook computers (not shown), and/or smartphones (not shown).

The computational system 106 may include a front-end processor-based device, for example a server computer system such as a Web server computer system 110 which includes one or more processors (not shown), nontransitory processor-readable media (not shown) and which executes processor-executable server instructions or software. The front-end server or Web server computer system 110 handles communication with the outside world. For example, the Web server computer system 110 provides an interface, for example a server application programming interface (SAPI) for the submission by the end user processor-based devices 104 of problems to be solved. Also for example, the Web server computer system 110 provides results of problem solving to the end user processor-based devices 104. The Web server computer system 110 may provide a user friendly user interface, for example a Web-based user interface. The Web server computer system 110 may, for example, handle users' accounts, including authentication and/or authorization to access various resources. The Web server computer system 110 may also implement a firewall between the remainder of the computational system 106 and the outside world (e.g., end user processor-based devices 104).

The SAPI accepts a broader range of problems including pseudo-Boolean optimization problems, constraint satisfaction problems, sampling problems, and the like. End users may, for example, indicate whether the solving should identify minima or should sample with Boltzmann probability. The SAPI also supports unconstrained QUBOs of arbitrary connectivity. That is accepts a logical graph with different connectivity than a working graph. The SAPI also accepts graphical models, for instance factor-graph description of undirected graphical models defined over binary-valued variables. The SAPI may allow for a description of factors specified with the scope of the factor and an extensional list of factor values. Support is preferably provided for factors mapping inputs to floating point values and to Boolean values for constraint satisfaction problems (CSP). The SAPI also accepts quadratic assignment problems (QAPs) since many practical problems involve assignment constraints. The SAPI may accept satisfiability problems (SAT), for instance: k-SAT, CSP; or max (weighted) SAT, a related optimization problem. Standard DIMACS formats exist for these types of problems.

Figure 3A:
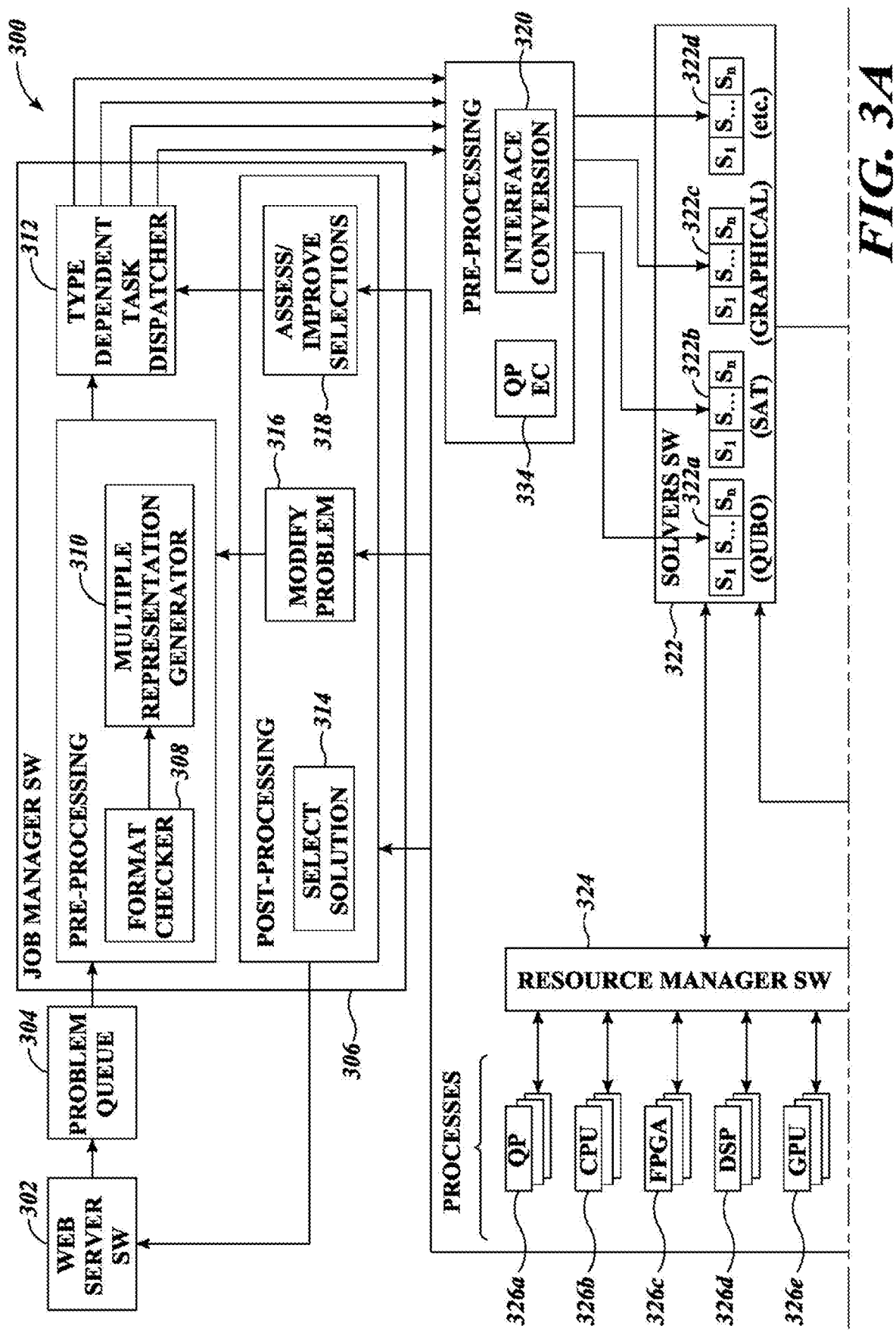
FIGS. 3A and 3B are schematic diagrams showing various sets of processor readable instructions, processes and abstraction layers implemented by the system of FIGS. 1A and 1B, such as a job manager instructions, resource manager instructions, solver instructions, pre-processing and post-processing instructions, in accordance with the presently described systems, devices, articles, and methods.
Figure 3B:
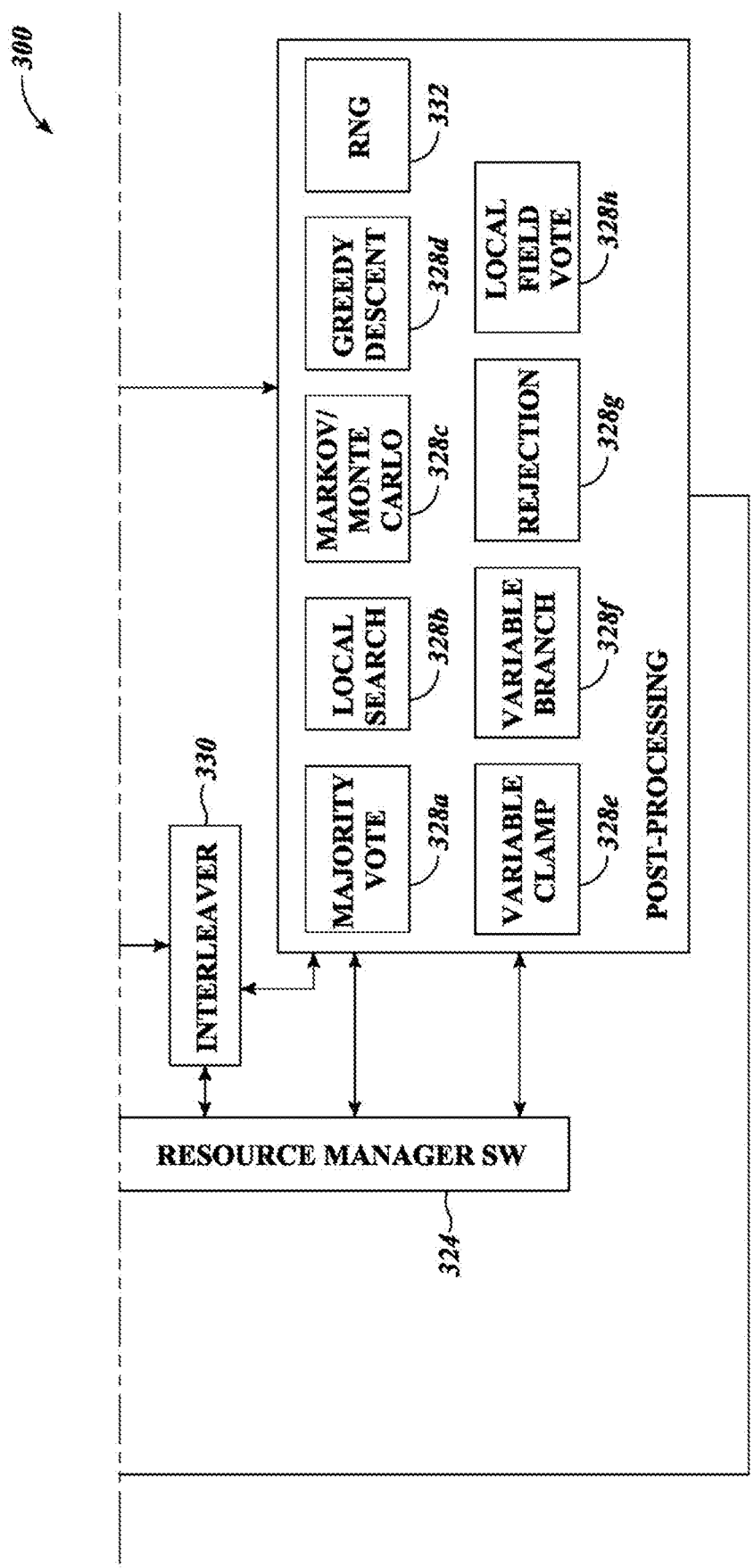

The computational system 106 may include job manager hardware 112 which manages jobs (i.e., submitted problems and results of problem solving). The job manager hardware 112 may be implemented as a standalone computing system, which may include one or more processors 114, processor-readable nontransitory storage media 116a-116d (four shown, collectively 116) and communications ports 118a, 118n (two shown, collectively 118). The processor(s) 114 may take a variety of forms, for example one or more microprocessors, each having one or more cores or CPUs, registers, etc. The job manager hardware 112 may include volatile media or memory, for example static random access memory (SRAM) or dynamic random access memory (DRAM) 116a. The job manager hardware 112 may include non-volatile media or memory, for example read only memory (ROM) 116d, flash memory 116b, or disk based memory such as magnetic hard disks, optical disks 116c, magnetic cassettes, etc. Those skilled in the relevant art will appreciate that some computer architectures conflate volatile memory and non-volatile memory. For example, data in volatile memory can be cached to non-volatile memory. Or a solid-state disk that employs integrated circuits to provide non-volatile memory. Some computers place data traditionally stored on disk in memory. As well, some media that are traditionally regarded as volatile can have a non-volatile form, e.g., Non-Volatile Dual In-line Memory Module variation of Dual In-line Memory Modules. The processor-readable nontransitory storage media 116 store(s) at least one set of processor-executable instructions and/or data (e.g., job manager instructions 306, FIGS. 3A and 3B) to manage problem solving jobs, which when executed by the job manager hardware 112 implements a job manager (FIGS. 3A and 3B).

The computational system 106 may include resource manager hardware 120 which manages hardware resources (e.g., processors) for use in solving problems via a plurality of solvers. The resource manager hardware 120 may be implemented as a standalone computing system, which may include one or more processors 122, each having one or more cores, processor-readable nontransitory storage media 124a-124d (four shown, collectively 124) and one or more communications ports 126. The processor(s) 122 may take a variety of forms, for example one or more microprocessors, each having one or more cores or CPUs, registers, etc. The resource manager hardware 120 may include non-volatile media or memory, for example read only memory (ROM) 124a, flash memory 124b, or disk based memory such as magnetic hard disks 124c, optical disks, etc. The resource manager hardware 120 may include volatile media or memory, for example static random access memory (SRAM) or dynamic random access memory (DRAM) 124d. The processor-readable nontransitory storage media 124 store(s) at least one of set of processor-executable instructions and/or data (e.g., resource manager instructions 324, FIGS. 3A and 3B) which when executed by the resource manager hardware 120 implements a resource manager to manage hardware resources, for example the various non-quantum processor systems and/or quantum processor systems and/or digital computer systems and/or analog computer systems set out immediately below. The resource manager may, for instance, manage an allocation of processor resources (e.g., quantum processor(s)) to solve a submitted problem via one or more solvers.

As noted above, the computational system 106 may further include a plurality of solver processor systems which execute solver instructions or software to implement a plurality of solvers to solve appropriate types of problems (e.g., QUBO matrix, satisfiability (SAT) problem, a graphical model (GM) or a quantum assignment problem (QAP)).

The solver processor systems may, for example, include one or more analog computers 130a-130c (three illustrated, collectively 130, only one shown in detail) including one or more quantum processors. Quantum processor systems 130 may take a variety of forms. Typically, quantum processors systems 130 will include one or more quantum processors 132 comprising a plurality of qubits 132a and couplers 132b (e.g., tunable ZZ-couplers) which are controllable to set a coupling strength between respective pairs of qubits 132a to provide pair-wise coupling between qubits. The quantum processor systems 130 may be implemented to physically realize quantum annealing (QA) and/or adiabatic quantum computing (AQC) by initializing the system in an initial state preferred by an initial Hamiltonian and evolving the system to a final state preferred by a problem Hamiltonian.

More generally, in some implementations, quantum processors 132 comprise a plurality of qubits and couplers which are controllable to set a coupling strength among multiple qubits. For example, some implementations can have higher-order interactions (also referred to as k-local interactions where k>2). The techniques described herein apply to implementations comprising pair-wise coupling between qubits and/or higher-order interactions among qubits.

The quantum processors systems 130 typically include a plurality of interfaces 134 operable to set or establish conditions or parameters of the qubits 132a and couplers 132b, and to read out the states of the qubits 132a, from time-to-time. The interfaces 134 may include a local bias interface to provide controllable local biases to the qubits 132a (e.g., tunable local diagonal bias). The interfaces 134 may each be realized by a respective inductive coupling structure, as part of a programming subsystem and/or an evolution subsystem. Interfaces for reading out states may, for instance take the form of DC-SQUID magnetometers. Such a programming subsystem and/or evolution subsystem may be separate from quantum processor 130, or it may be included locally (i.e., on-chip with quantum processor 130) as described in, for example, U.S. Pat. Nos. 7,876,248; and 8,035,540.

The quantum processors systems 130 typically each include a controller 136, for instance a digital computer system, which is operated to configure the quantum processor 132. The quantum processors systems 130 typically each include a refrigeration system 138, operable to reduce a temperature of the quantum processor 132 to a point at or below which various elements of the quantum processor 132 (e.g., qubits 132a, couplers 132b) superconduct. Superconducting quantum computers normally are operated at milliKelvin temperatures and often are operated in a dilution refrigerator. Examples of dilution refrigerators include the Oxford Instruments Triton 400 (Oxford Instruments plc, Tubney Woods, Abingdon, Oxfordshire, UK) and BlueFors LD 400 (BlueFors Cryogenics Oy Ltd, Arinatie 10, Helsinki, Finland). All or part of the components of quantum processor may be housed in a dilution refrigerator.

In the operation of a quantum processor system 130, interfaces 134 may each be used to couple a flux signal into a respective compound Josephson junction of qubits 132a, thereby realizing the tunneling terms (also called $\Delta_i$ terms) in the system Hamiltonian. This coupling provides the off-diagonal terms ($\sigma^x$ terms) of the Hamiltonian and these flux signals are examples of "dislocation signals." Other ones of the interfaces 134 may each be used to couple a flux signal into a respective qubit loop of qubits 132a, thereby realizing the local bias terms (also called $h_i$ terms) in the system Hamiltonian. This coupling provides the diagonal terms ($\sigma^z$ terms). Furthermore, one or more interfaces 134 may be used to couple a flux signal into couplers 132b, thereby realizing the $J_{i,j}$ term(s) in the system Hamiltonian. This coupling provides the diagonal terms ($\sigma^z_i\sigma^z_j$ terms). Thus, throughout this specification and the appended claims, the terms "problem formulation" and "configuration of a number of programmable parameters" are used to refer to, for example, a specific assignment of $h_i$ and $J_{ij}$ terms in the system Hamiltonian of a superconducting quantum processor via, for example, interfaces 134.

The solver processor systems may, for example, include one or more non-quantum processor systems. Non-quantum processor systems may take a variety of forms, at least some of which are discussed immediately below.

For example, the non-quantum processor systems may include one or more microprocessor based systems 140a-140c (three illustrated, collectively 140, only one shown in detail). Typically, microprocessor based systems 140 will each include one or more microprocessors 142 (three shown, only one called out in FIGS. 3A and 3B), processor-readable nontransitory storage media 144a-144d (four shown, collectively 144) and one or more communications ports 146. The processor(s) 142 may take a variety of forms, for example one or more microprocessors, each having one or more cores or CPUs with associated registers, arithmetic logic units, etc. The microprocessor based systems 140 may include non-volatile media or memory, for example read only memory (ROM) 144d, flash memory 144b, or disk based memory such as magnetic hard disks 144c, optical disks, etc. The microprocessor based systems 140 may include volatile media or memory, for example static random access memory (SRAM) or dynamic random access memory (DRAM) 144a. The processor-readable nontransitory storage media 144 store(s) at least one of a set of processor-executable instructions and/or data which when executed by the microprocessor based systems 142 implements a microprocessor based solver to solve a submitted problem.

Also for example, the non-quantum processor systems may include one or more field programmable arrays (FPGA) based systems 150a-150c (three illustrated, collectively 150, only one shown in detail). Typically, FPGA based systems 150 will each include one or more FPGAs 152, processor-readable nontransitory storage media 154a-154d (four shown, collectively 154) and one or more communications ports 156. The FPGAs 152 may take a variety of forms, for example one or more FPGAs 152. The FPGA based systems 150 may include non-volatile media or memory, for example, read only memory (ROM) 154d, flash memory 154b, or disk based memory such as magnetic hard disks 154c, optical disks, etc. The FPGA based systems 150 may include volatile media or memory, for example static random access memory (SRAM) or dynamic random access memory (DRAM) 154d. The processor-readable nontransitory storage media 154 store(s) at least one of a set of processor-executable instructions and/or data which when executed by the FPGA based systems 150 implements a FPGA based solver to solve a submitted problem.

Also for example, the non-quantum processor systems may include one or more digital signal processor based systems 160a-160c (three illustrated, collectively 160, only one shown in detail). Typically, DSP based systems 160 will include one or more DSPs 162, processor-readable nontransitory storage media 164a-164d (four shown, collectively 160) and one or more communications ports 166. The DSPs 162 may take a variety of forms, for example one or more DSPs, each having one or more cores or CPUs, registers, etc. The DSP based systems 160 may include non-volatile media or memory, for example read only memory (ROM) 164d, flash memory 164b, or disk based memory such as magnetic hard disks 164c, optical disks, etc. The DSP based systems 160 may include volatile media or memory, for example static random access memory (SRAM) or dynamic random access memory (DRAM) 164a. The processor-readable non-transitory storage media 164 store(s) at least one of a set of processor-executable instructions and/or data which when executed by the DSP based systems 160 implements a DSP based solver to solve a submitted problem.

For example, the non-quantum processor systems may include one or more graphical processing unit (GPU) based systems 170a-170c (three illustrated, collectively 170, only one shown in detail). Typically, GPU based systems 170 will include one or more GPUs 172, processor-readable nontransitory storage media 174a-174d (four shown, collectively 174) and communications ports 176. The GPUs 172 may take a variety of forms, for example one or more GPUs, each having one or more cores or CPUs, registers, etc. The GPU based systems 170 may include non-volatile media or memory, for example, read only memory (ROM) 174d, flash memory 174b, or disk based memory such as magnetic hard disks 174c, optical disks, etc. The GPU based systems 170 may include volatile media or memory, for example static random access memory (SRAM) or dynamic random access memory (DRAM) 174a. The processor-readable nontransitory storage media 174 store(s) at least one of a set of processor-executable instructions and/or data which when executed by the GPU based systems 170 implements a GPU based solver to solve a submitted problem.

Microprocessors offer relatively few cores with large amount of fast memory per core. Microprocessors are the most flexible platform in terms of development among the four non-quantum technologies discussed herein. Microprocessors also have the fastest clock speed and the most extensive instruction sets of the four non-quantum technologies discussed herein, which includes vector operations. An example of a currently available high performance microprocessor running 8 cores with a clock speed of 3.1 GHz is the Xeon Processor E5-2687 W offered by Intel Corporation.

DSPs are the closest to microprocessors in characteristics and abilities of the four non-quantum technologies discussed herein. The main advantage of DSPs are their advanced ALU units optimized for special numerical operations like Multiply-Accumulate (MAC) as compared to microprocessors. An example of a high performance DSP running 8 cores with a clock speed of 1.4 GHz is the TMS320C6678 Multicore Fixed and Floating Point DSP Processor offered by Texas Instruments. Creating a custom board with a plurality of DSPs is typically simpler than creating a customer board using microprocessors. Most advanced DSPs offer built-in functionalities that simplify task management and interfacing with other devices.

GPUs offer the largest number of inexpensive cores in a single unit (e.g., up to more than 5000 cores in the commercially available GeForce Titan Z offered by NVIDIA Corporation). GPU clock speeds are comparable to DSP processors (e.g., in 1 GHz range), but suffer from the limited amount of shared memory per core. GPUs implement single instruction, multiple data (SIMD) architectures, which cause all cores to run the same instruction in each cycle. Therefore, methods that require some serial work after a short amount of parallel work achieve significantly lower performance compared to completely parallel approaches, for the same amount of total work. An example of a commercially available GPU running 1536 cores at a clock speed of 1 GHz is the GeForce GTX 770 offered by NVIDIA. However, NVIDIA strongly recommends the use of Tesla GPUs for high performance computation.

FPGAs comprise of a pool of logic gates, memory blocks and simple DSP units that can be "wired up" programmatically. FGPAs offer a large amount of fast distributed memory and DSP units. The clock speed of an FGPA depends on the implemented circuit, but is typically lower than the other three non-quantum technologies discussed herein. For example, a clock speed of about 200 MHz is a reasonable clock speed in many cases. There is a relatively small limit on the number of times an FPGA can be programmed (roughly 100,000 times), so applications that require switching between multiple designs on-demand should utilize multiple FPGAs. An example of a currently available high performance FPGA is Xilinx's XC7VX485T, which has approximately half a million logic cells and flip-flops, more than one thousand 36 Kb memory blocks and 2800 DSP units.

Figure 2:
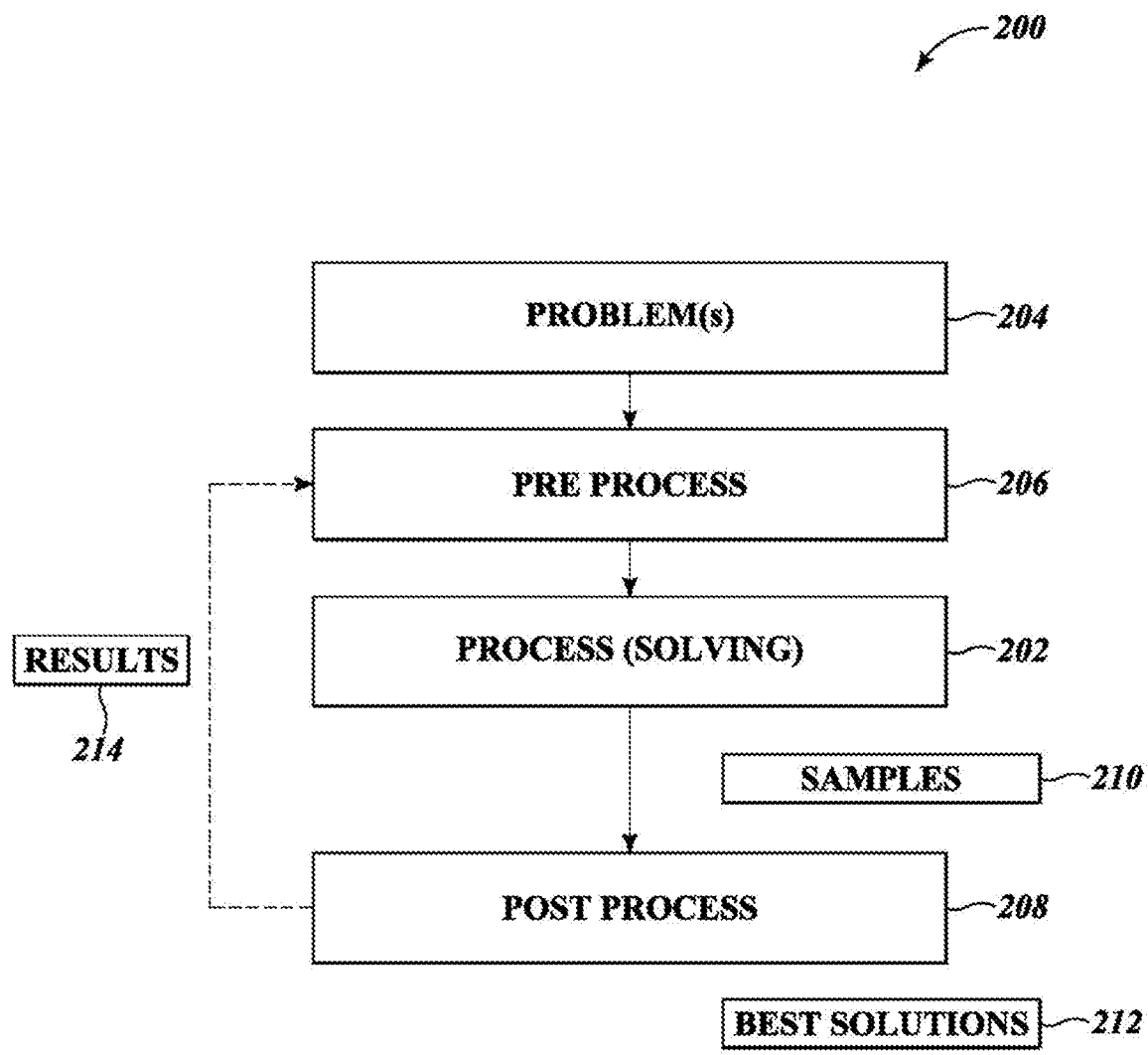
FIG. 2 is a high level schematic diagram of a relationship between pre-processing, processing, post-processing and optionally auxiliary processing implemented in the system of FIGS. 1A and 1B, in accordance with the presently described systems, devices, articles, and methods.

FIG. 2 shows a high level relationship between various aspects of the operation of the computational system of FIGS. 1A and 1B.

In particular, the computational system performs processing 202 in the form of solving submitted problems 204, typically via one or more of solvers, for instance one or more of a plurality of heuristic optimizers executed via hardware resources.

In preparation to performing the processing 202 on each problem 204, the computational system may perform pre-processing 206. As discussed in detail in reference to other Figures (e.g., FIGS. 3A and 3B), the pre-processing 206 may, for example, include one or more of format checking, problem representation generation, solver selection, and/or interface conversion. As discussed in detail in reference to other Figures (e.g., FIGS. 3A and 3B), the pre-processing 206 may, for example, be performed by various processors or systems, and/or may be performed by various logical abstractions in the instructions sets. For instance, some pre-processing 206 may be performed by the job manager hardware, executing job manager software, while other pre-processing may be executed by solver hardware executing solver specific pre-processing instructions.

Subsequent to performing the processing 202 on each problem 204 or representation thereof, the computational system may perform post-processing 208. As discussed in detail in reference to other Figures (e.g., FIGS. 3A and 3B), the post-processing 208 may, for example, include evaluating various samples or tentative responses or answers 210 to determine a solution for each iteration of solving performed on a problem, and/or evaluating various potential solutions to determine a best solution 212 for the problem 204. As discussed in detail in reference to other Figures (e.g., FIGS. 3A and 3B), the post-processing 208 may additionally include modifying a problem 204 based at least in part on results 214 to a previous processing for another iteration of processing. As discussed in detail in reference to other Figures (e.g., FIGS. 3A and 3B), the post-processing 208 may, for example, be performed by various processors or systems, and/or may be performed by various logical abstractions in the instructions sets. For instance, some post-processing 208 may be performed by the job manager hardware, executing job manager software, while other post-processing 208 may be executed by solver hardware executing solver specific post-processing instructions.

In some implementations, the computational system may assess the performance of different solvers on various types of problems, which may be used to refine or improve the selection of solvers for subsequently submitted problems.

FIGS. 3A and 3B illustrate various processor readable instructions sets, processes, and abstraction layers (collectively 300), for execution by the computational system 100

(FIGS. 1A and 1B) in problem solving, according to the presently described systems, devices, articles and methods.

Server instructions 302 may be executed, for instance via server hardware 110 (FIGS. 1A and 1B) to implement a server, for instance a Web server. The Web server allows the submission of problems of various types, as well as providing the results and/or solutions to the submitted problems. The Web server may queue the submitted problems 304 for solution via pre-processing, processing and post-processing.

A set of job manager instructions 306 may be executed, for instance via job manager hardware 112 (FIGS. 1A and 1B) to implement a job manager. The job manager may perform job management on submitted problems via the problem queue, via pre-processing and post-processing. It may also cause the processing of problems or the processing of representations of problems by one or more solvers via one or more solver resources 130, 140, 150, 160, or 170 (FIGS. 1A and 1B).

The job manager may verify a format of each submitted problem, determining whether the problem is suitable for solving via the computational system. The job manager may identify the most appropriate solver(s) for each submitted problem. As previously explained, the job manager may use information about previous attempts to select portfolios of solvers to run in parallel based on problem type or features. In some instances, the job manager may select two or more solvers for a particular problem, run the selected solvers in parallel and return an answer. Where the job manager may gather results from the processing by the solvers, the job manager may select a best answer. A best answer may be, for instance, an answer from the solver that finishes first with a satisfactory solution, or an answer from the solver that produces the best or closest solution within a fixed time. Additionally, the job manager may slice jobs and handle high level communications between various ones of the solvers.

In particular, the job manager instructions 306 may include a format checker set of instructions 308. The format checker set of instructions 308 performs pre-processing on each submitted problem, analyzing the submitted problem to determine whether the submitted problem is a suitable type of problem for the computational system. If the submitted problem is not a suitable type of problem for the computational system, the format checker set of instructions 308 may cause an appropriate notification to be provided to the end user 102 (FIGS. 1A and 1B) or end user device 104 (FIGS. 1A and 1B) which submitted the respective problem, for example via the Web server instructions 302.

The job manager instructions 306 may include a multiple representation generator set of instructions 310. The multiple representation generator set of instructions 310 performs pre-processing on each submitted problem, producing multiple representations of the submitted problem.

The job manager instructions 306 may include a type dependent task dispatcher set of instructions 312. The type dependent task dispatcher set of instructions 312 causes the various representations of the submitted problem to be sent to solvers for solving. The type dependent task dispatcher set of instructions 312 may, for example, select an appropriate one or more solvers for each submitted problem, the solvers selected from a plurality of available solvers. Selection of appropriate solvers may include selection of specific solver methods as well as selection of specific types of hardware resources (e.g., quantum processor 130, microprocessor 140, FPGA 150, DSP 160, GPU 170 (FIGS. 1A and 1B)) to execute the selected solver methods.

The job manager instructions 306 may include a selection solution set of instructions 314. The selection solution set of instructions 314 performs post-processing on results or solutions for each submitted problem, producing a best result or best results from the returned results. The selection solution set of instructions 314 may employ a variety of techniques in selecting a best solution, which are generally discussed herein. For example, one technique may include selecting the median solution from a plurality of solver iterations executed on the particular problem.

The job manager instructions 306 may include a modify problem set of instructions 316. The modify problem set of instructions 316 may modify a problem based on results or samples from a previous iteration of processing or solving performed on the problem. As such, the modify problem set of instructions 316 may be considered post-processing since information from a previous iteration is being used to refine the problem or representation of the problem, and is illustrated as such in FIGS. 3A and 3B. The modify problem set of instructions 316 may also be considered pre-processing, since the problem is being modified or re-represented for solving via one or more solvers. The denomination of the modify problem set of instructions 316 as either pre-processing or post-processing should not be considered limiting.

The job manager instructions 306 may optionally include an assess and improve selections set of instructions 318. The assess and improve selections set of instructions 318 may employ various techniques. Such may, for example, improve subsequent selection of solvers for subsequently submitted problems. As such, the assess and improve selections set of instructions 318 may be considered post-processing since information from a previous iteration is being used to refine the problem or representation of the problem, and is illustrated as such in FIGS. 3A and 3B. The denomination of the assess and improve selections set of instructions 318 as either pre-processing or post-processing should not be considered limiting.

The job manager can perform computationally heavy work (e.g., ranking to predict solver performance, generating multiple representations of a submitted problem, etc.). Other operations performed by the job manager such as pre-processing operations relative to the solver (e.g., format check) and post-processing operations relative to the solver (e.g., selecting a solution or best solution) tend to be more simplistic compared to pre-processing and post-processing operations performed by the solvers.

The job manager 306 may be considered as an abstraction layer in an overall computational scheme for the computational system 100. Thus, while some functions are illustrated in FIGS. 3A and 3B as being performed via the job manager 306, in some implementations, those functions could be performed by another abstraction layer or set of processor readable instructions. Thus, the denomination of a function or set of processor readable instructions as being within the job manager 306 should not be considered limiting.

A set of interface conversion instructions 320 may be executed, for instance via solver hardware 130, 140, 150, 160, or 170 (FIGS. 1A and 1B). The interface conversion instructions 320 may be specific to the selected solver(s), and may convert the representations of the problem into a format or form suitable for the selected solver(s). The set of interface conversion instructions 320 prepare the problem for the processing or solving thereof via the respective solvers. Therefore, the set of interface conversion instructions 320 are denominated as forming part of the pre-processing portion of the computational system 100 (FIGS. 1A and 1B).

A set of solver instructions 322a-322d (collectively 322) may be executed, for instance via solver hardware 130, 140, 150, 160, or 170 (FIGS. 1A and 1B), to process or solve the pre-processed problems. As previously noted, the job manager instructions 306 may select the specific solver or solvers 322 for any particular problem. Example solvers include QUBO solvers 322a, satisfiability solvers 322b, graphical model solvers 322c, etc. 322d.

While not intended to be limiting, a number of solver methods and techniques are set out below. The solvers (i.e., solver instructions 322 as executed by the solver hardware resources such 130, 140, 150, 160, or 170) of the computational system 100/300 may implement any one, more or all of these solver methods or techniques. The computational system 100/300 may run a given problem by exploiting multiple solver software resources on various solver hardware platforms. The solvers may include sub-solvers running on different platforms, which may be ultimately responsible for solving the jobs or problems.

Given a problem of a particular format, the computational system 100/300 may provide alternative types, formats or classes of the problem to initiate the solving of the problem. The computational system 100/300 may be capable of solving a variety of different types or formats of problems. Two types, formats or classes of problems are quadratic unconstrained binary optimization ("QUBO") problems and satisfiability (SAT) problems. Another type, format or class of problems is graphical model (GM) problems. A graphical model encodes conditional independence that exists amongst variables of the problem where each variable represents a set of qubits coupled together as a chain. The graphical model problem allows for the application of additional techniques or methods at the level of sets or chains.

The computational system 100/300 may include a quantum processor error correction set of instructions 334 which performs error correction of the quantum processor. The quantum processor error correction set of instructions 334 may, for example, identify biases in quantum devices toward +1 or −1 states, and correct for such bias. The quantum processor error correction set of instructions 334 may be executed by a variety of processor based devices, for instance a control system or computer associated with a particular quantum processor that is the subject of the error correction.

Figure 4:
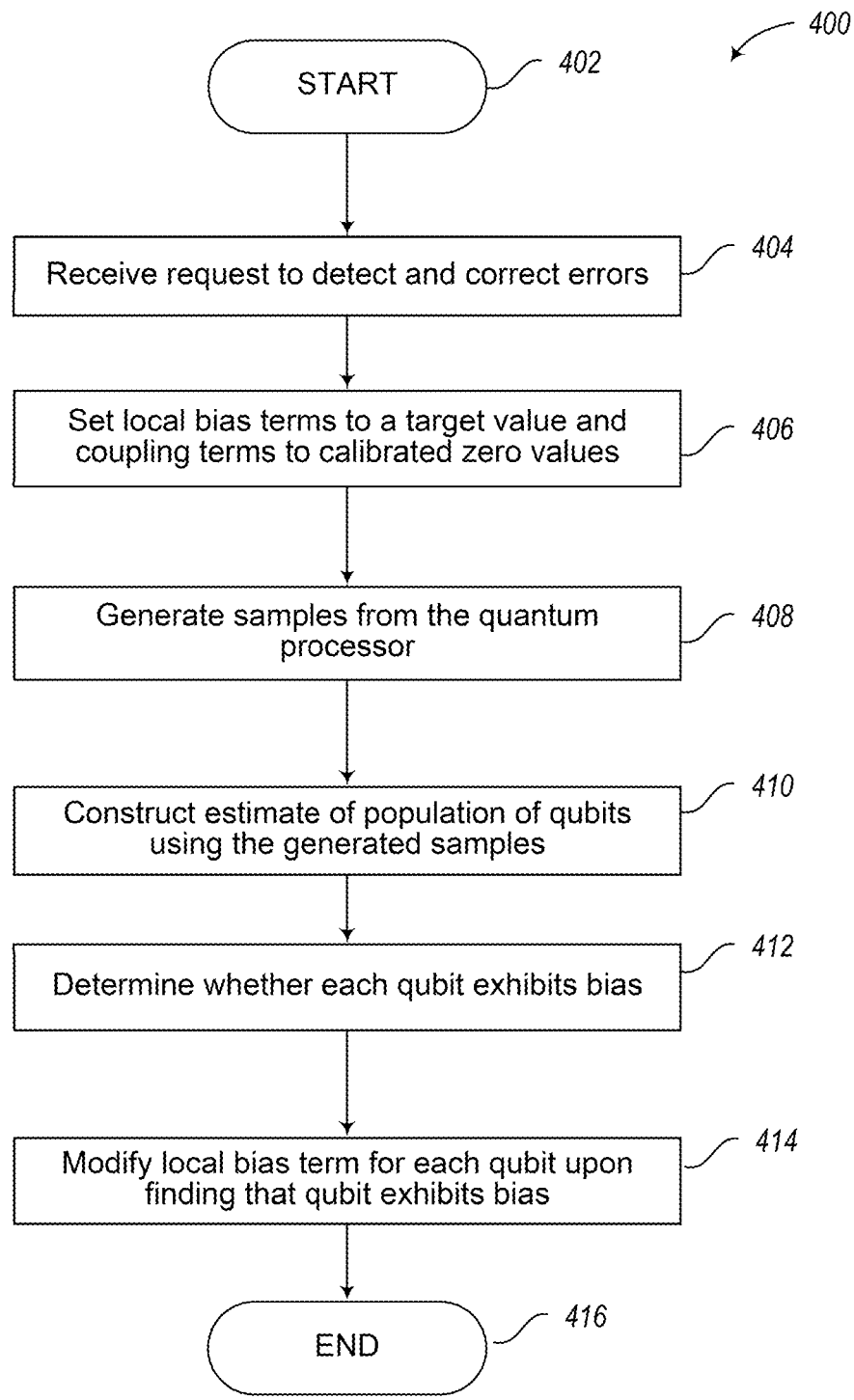
FIG. 4 is a flow diagram showing a high-level method of operation in a computational system including one or more quantum processors to correct for biases in physical qubits of the one or more quantum processors, in accordance with the presently described systems, devices, articles, and methods.

FIG. 4 is a flow diagram showing a method 400 that implements a calibration correction for local bias values ($h_i$) to increase a performance of a quantum processor in accordance with the present methods, systems and devices. Specifically, the method 400 may be implemented to correct errors in specifying local bias values caused by shifts in qubit degeneracy point due to low frequency noise, residual coupling errors (i.e., J=0 errors), etc. For more information on low frequency noise see U.S. provisional patent application Ser. No. 62/120,723, filed Feb. 25, 2015. For more information residual coupling or unintended coupling see U.S. patent application Ser. No. 14/643,180, filed Mar. 10, 2015.

The method 400 could be implemented by a series of processor-readable instructions (also referred to as "computer-readable instructions") and data stored on one or more nontransitory processor-readable media. Some examples of the method 400 are performed in part by a specialized device such as an adiabatic quantum processor or a quantum annealer or a system to program or otherwise control operation of an adiabatic quantum computer or a quantum annealer, for instance a computer that includes at least one digital processor. The method 400 includes various acts, though those of skill in the art will appreciate that in alternative examples certain acts may be omitted and/or additional acts may be added. Those of skill in the art will appreciate that the illustrated order of the acts is shown for exemplary purposes only and may change in alternative examples.

The method 400 starts at 402, for example in response to a call from another routine.

At 404, a computational system receives a request to detect and, as needed, correct errors in the local biases specified for a quantum processor. The computational system receives information specifying a quantum processor. The information may contain information defining a plurality of qubits. Examples of the information include an index to the plurality of qubits. In some implementations, the computational system receives a problem Hamiltonian ($H_P$). An example of a problem Hamiltonian is shown in equation 30. The problem Hamiltonian includes a plurality of parameters. The plurality of parameters specify the problem Hamiltonian. For example, the plurality of parameters include a set of single qubit parameters, such as the local bias terms ($h_i$) for individual qubits. As well, in the same and other examples, the plurality of parameters include a set of two qubit parameters or coupling terms ($J_{ij}$).

At 406, the processor-based device sets a plurality of the local bias terms ($h_i$) to a target value as defined by a calibrated zero. In some implementations, the local bias terms ranging between and including a flux value corresponding to about $h_i=-1$ and about $h_i=+1$. For example, the processor-based device sets the local bias terms ($h_i$) to −1, relative to a calibrated zero. In some implementations, the target value is zero. In act 406, the processor-based device sets a plurality of the coupling terms ($J_{ij}$) to a calibrated zero value.

At 408, the computational system generates or causes generation of samples from the quantum processor, and/or receives samples from the quantum processor.

A problem Hamiltonian may be solved on the quantum processor, for example using quantum annealing. The quantum processor comprises qubits are cooled to below a critical temperature at which the qubits are superconducting. The computational system initializes the quantum processor, evolves the processor towards a final state as specified by the problem Hamiltonian, and reads out the result. The result of the computation, a sample, is received as output from the quantum processor by the computer (e.g., classical or digital processor). The solution includes a plurality of values assigned to the set of qubits. The computational system may be operated to generate a number of samples to solve one or more problems.

At 410, the processor-based device constructs an estimate of the population of qubits in the graph of the quantum processor. In some implementations, drawing on the number of samples from the quantum processor, the processor-based device defines a histogram with one bin for each basis state.

At 412, the processor-based device determines whether each qubit exhibits a bias toward a basis state (e.g., a bias toward +1 or −1). If the target value is non-zero the populations will be biased but a determination is made as to whether there is an unintended bias. In some implementations, this includes determining if there is an imbalance in the histogram. In some implementations, the processor-based device constructs an estimate of the population and determines if a bias is present for plurality of qubits in the hardware graph of the processor. In some implementations, the processor-based device constructs an estimate of the population and determines if a bias is present for a plurality of qubits in the working processor graph, or working graph, of the processor.

The problem Hamiltonian may include information defining a problem graph. The problem graph specifies a set of variables and couplings between some of these variables depending on the problem. The variables and couplings are in essence a set of nodes and edges of an undirected graph. A quantum processor also can also be described as a graph, referred to as a processor or hardware graph. In the processor or hardware graph there are representations of a plurality of qubits and some of the qubits are directly communicatively coupleable to one another via couplers, without intervening qubits. Mapping of the problem graph to the processor or hardware graph is known as embedding. Also there may be a subset of the hardware graph, the working processor graph.

Calibration determines if the components (e.g., qubits, couplers) of the actual or as manufactured quantum processor are operational (e.g., within tolerances of operational specifications). Such may include testing of various components (e.g., qubits, couplers) to determine whether such components function within operational specifications. It may be useful to generate a working processor graph which omits components which are not operational or which are out of operational specification. The working processor graph is a logical construct, stored in a nontransitory computer- or processor-readable medium, which is a representation of the actual or "as manufactured" physical topology or architecture of the processor accounting for manufacturing or fabrication defects or otherwise out of specification components.

At 414, the processor-based device adjusts, as needed, the local bias term ($h_i$) applied to each qubit to define the degeneracy point for each qubit. That is, correct for the bias toward one of the basis states as exhibited and determined. This process may be executed iteratively until none of the qubits of the quantum processor exhibit a bias, or at least until some termination criteria is met (e.g., a calibration time is exceeded, a number N of calibration iterations is reached, or a maximum bias threshold is met). With the correction in place, the processor-based device may then submit the requested problem to be solved to the quantum processor.

The method 400 ends at 416, for example until invoked again. For example, the method 400 may be called or otherwise invoked when it is beneficial to obtain updated or "on-the-fly" calibration parameters for the quantum processor. As an example, the quantum processor may be programmed to obtain 50,000 samples to solve one or more problems. In some implementations, the method 400 may be interleaved with the collection of the 50,000 samples to provide relatively updated calibration parameters during collection. For example, the method 400 may be called after every 1,000 samples are collected, or after a certain time has elapsed during collection of the samples. Advantageously, the method 400 may be executed after the quantum processor has been operated for an extended period of time (e.g., one minute, hour, day, week, month, etc.), during which drifts or other errors may have otherwise degraded the performance of the quantum processor. The method 400 may be executed after the quantum processor is given sufficient time to thermalize and arrive at a base temperature. In some implementations, the base temperature is below that of the critical temperature of the primary superconducting material within the quantum processor. For example, the quantum processor is cooled with little or no input and output activity. The time needed to thermalize is dependent on many implementation specific factors and an hour has been found to be a convenient period.

Figure 5:
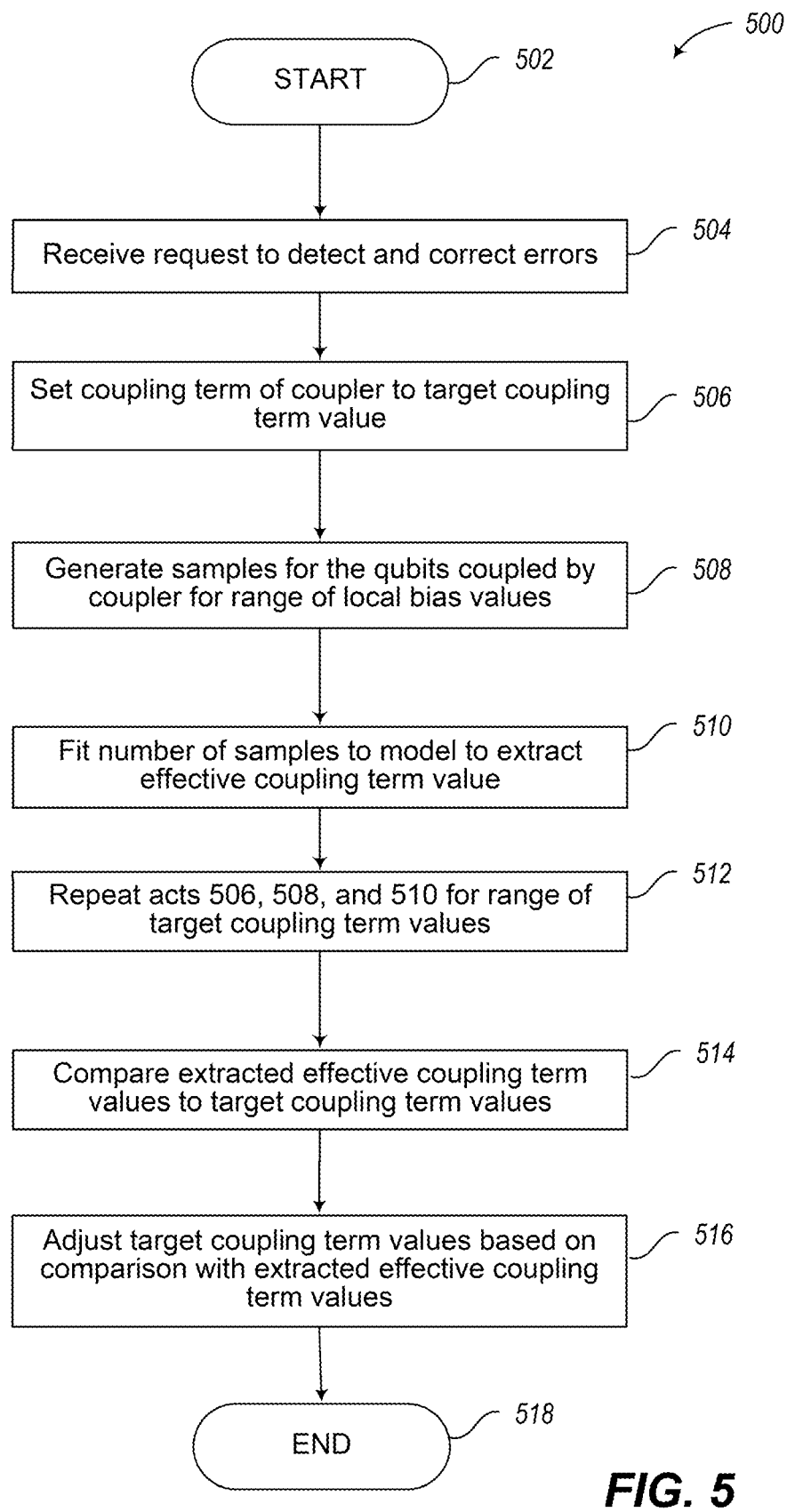
FIG. 5 is a flow diagram showing a high-level method of operation in a computational system including one or more quantum processors to correct for biases in couplers of the one or more quantum processors, in accordance with the presently described systems, devices, articles, and methods.

FIG. 5 is a flow diagram showing a method 500 of calibration correction for coupling terms ($J_{ij}$) to increase the performance of a quantum processor in accordance with the present methods, systems and devices. The method 500 may be implemented to correct for drifts in the current supplied by the electronics of a quantum processor, or small errors constructing an effective coupling terms model ("J model") that can increase coupling term related intrinsic/control errors.

The method 500 could be implemented by a series or set of processor-readable instructions stored on one or more nontransitory processor-readable media. Some examples of the method 500 are performed in part by a specialized device such as an adiabatic quantum computer or a quantum annealer or a system to program or otherwise control operation of an adiabatic quantum computer or a quantum annealer, for instance a computer that includes at least one digital processor. The method 500 includes various acts, though those of skill in the art will appreciate that in alternative examples certain acts may be omitted and/or additional acts may be added. Those of skill in the art will appreciate that the illustrated order of the acts is shown for exemplary purposes only and may change in alternative examples.

The method 500 starts at 502, for example in response to a call from another routine or other invocation.

At 504, the computational system receives a request to detect and as needed correct errors in the calibration for coupling terms. Example information in the request is described above with reference to act 408 of method 400 (FIG. 4) and are not repeated here for brevity.

At 506, for a particular coupler, the processor-based device sets the coupling term for a plurality of couplers to a target coupling term value ($J_{ij}$) relative to a calibrated zero.

At 508, the processor-based device generates or causes generation of a number of samples from the quantum processor for a range of local bias term values $h_i$ and $h_j$ for the two qubits coupled by the coupler, and/or receives a number of samples from the quantum processor. For example, the range of inter-qubit couplings may be restricted to within $-1 \leq J_{ij} \leq +1$ and local bias terms to within $-1 \leq h_i \leq 1$. Thus, for a particular target coupling term value (e.g., $J_{ij}=-0.5$), samples are collected for a range of $h_i$ and a range of $h_j$ (e.g., $-1 \leq h_i, h_j \leq 1$). At 510, the processor-based device fits statistics for the collected samples to a model (e.g., a simple thermal model) to extract an effective temperature and an effective $J_{ij}$. Examples of a thermal model include a model that assumes the quantum processor's states follow the Boltzmann distribution at a finite temperature. Examples of a thermal model include a model where the frequency of measuring a state (f) is proportional to a Boltzmann factor. For example:

$$f(s) \propto e^{-E(s)/k_B T} \tag{34}$$

Where s is a state of the quantum processor, $k_B$ is the Boltzmann constant, and T is temperature. The energy of the state E(s) is based on by the problem Hamiltonian. In some implementation is augmented to provide more parameters for fitting. For example:

$$E(s) \propto \Sigma_{i=1}^{N}(h_i + \delta h_i)s_i + \Sigma_{j>i}^{N}\Sigma_{i=1}^{N}J_{ij}^{eff}s_i s_j + F(\alpha, X) \tag{35}$$

Where the last term is a function based on parameters not in the problem Hamiltonian, e.g., magnetic susceptibility, X; and line width spread, α. The parameters the model, for example, temperature, magnetic susceptibility, are varied until the model best first the data collected at 510.

At 512, the processor-based device repeats acts 506, 508 and 510 for a range of $J_{ij}$ values (e.g., $-1 \leq J_{ij} \leq +1$) for the coupler to obtain a number of effective coupling term values $J_{ij}$ that each corresponds to a respective target coupling term value.

At 514, the processor-based device compares the range of target coupling term values to the determined effective coupling term values. At 516, the processor-based device adjusts the target coupling term values based on the comparison with the extracted effective coupling term values. For example, in some implementations the processor-based device may use a low order polynomial correction to correct the coupling terms requested by a problem. In some implementations, the polynomial has the form:

$$J_{ij}^{eff} = \Sigma_{m=0}^{M} \alpha_m (J_{ij}^{req})^m \quad (36)$$

Where the parameters a characterize the offset, slope, curvature, and inflection to convert the coupling value requested ($J_{ij}^{req}$) into the effective coupling value ($J_{ij}^{eff}$). In some implementations, a third order polynomial is used.

In some implementations the processor-based device may use a spline to effect correction. However, Applicant has found and believes low order polynomials to be more effective for interpolation. In some implantations, a low order polynomial is used for interpolation and splines are used for extrapolation. With the correction in place, the processor-based device may then submit the requested problem to be solved to the quantum processor.

FIGS. 7A and 7B illustrate graphs 700 and 702, respectively of example data without the aforementioned error correction. The graph 700 of FIG. 7A illustrates effective coupling term values, as extracted from the model, versus requested or target coupling term values without correction. The graph 700 can be regarded as a lookup table to convert between requested coupling term values and effective coupling term values. However, each data point has a cost to generate so interpolation and optionally extrapolation is used. Also plotted in graph 700 is a linear fit to interpolate the data. The graph 702 of FIG. 7B illustrates the residual from the linear fit shown in the graph 700 of FIG. 7A. From the graphs 700 and 702 one can see a gain, offset, and nonlinearity in the effective measured coupling term values. Further the nonlinearity and non-zero mean residual suggests a bias.

FIGS. 7C and 7D illustrate graphs 704 and 706, respectively, of example data after applying a third order correction to the coupling term values $J_{ij}$. Specifically, the graph 704 of FIG. 7C illustrates effective coupling term values versus requested or target coupling term. Here, in contrast to FIG. 7A, a third order polynomial is fit to the data. The graph 706 of FIG. 7D illustrates the residual from the third order fit shown in the graph 704 of FIG. 7C. The residuals are smaller by a factor of ten and the mean of them is closer to zero.

The method 500 ends at 518 until started again. For example, the method 500 may be repeated for each coupler in a quantum processor. The method 500 may also be called any time it is beneficial to obtain updated or "on-the-fly" calibration parameters for the quantum processor (e.g., after the quantum processor has been operating for an extended period of time after initial calibration).

Couplers that couple qubits to form a logical qubit are referred to herein as intra-logical qubit couplers, where each of the qubit couplers has a respective coupling strength that couples a respective pair of the physical qubits as a logical qubit. In some implementations, each of the qubit couplers can have a respective coupling strength that ferromagnetically couples a respective pair of the physical qubits as a logical qubit. In other implementations, another suitable manner of coupling can be used.

More generally, in some implementations, each of the qubit couplers can have a respective coupling strength that couples multiple qubits (more than two) as a logical qubit.

Couplers that are not intra-logical couplers (i.e., inter-logical qubit couplers) have a respective coupling strength that controllably couples a respective pair of physical qubits, where the physical qubits in the respective pair each belong to respective ones of two different ones of the logical qubits and wherein at least two variables from a problem are assigned to two respective logical qubits.

More generally, in some implementations, each of the couplers that are not intra-logical couplers can have a respective coupling strength that couples multiple qubits (more than two) as a logical qubit.

When inter-logical qubit couplers are tuned, an unintended flux offset may be introduced into the couplers that attach a logical qubit to other logical qubits. Infrastructure may be provided to compensate for these flux offsets, but small residual offsets may remain. In particular, when a set of qubits are connected with couplers each having a coupling strength $J_u$ to form a logical qubit, the logical qubit may acquire an effective bias toward one of the two states in the logical subspace (e.g., toward +1 or −1).

Figure 6:
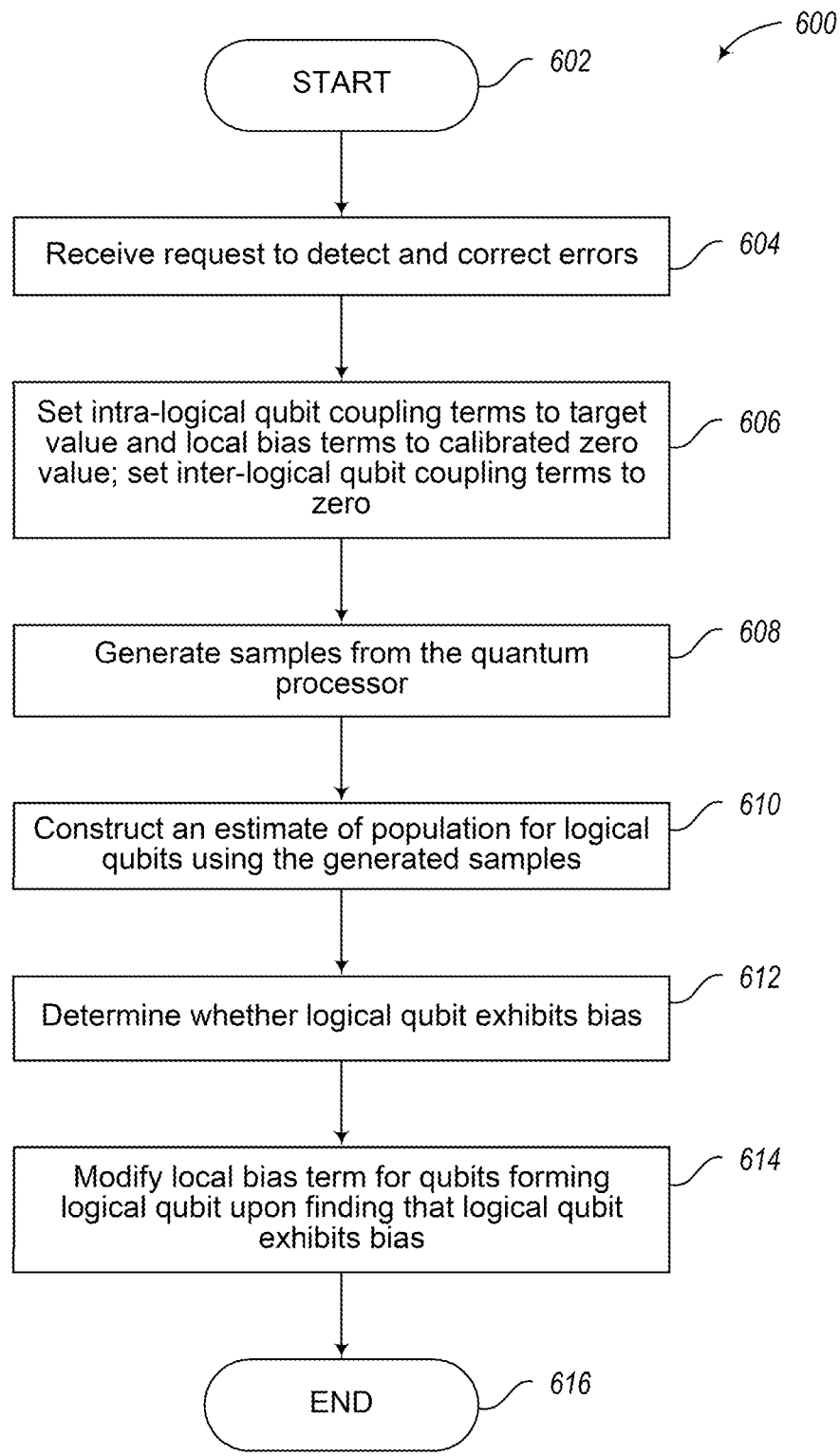
FIG. 6 is a flow diagram showing a high-level method of operation in a computational system including one or more quantum processors to correct for biases in logical qubits of the one or more quantum processors, in accordance with the presently described systems, devices, articles, and methods.

FIG. 6 is a flow diagram showing a method 600 for implementing a calibration correction for local bias values ($h_i$) of qubits forming a logical qubit to increase the performance of a quantum processor in accordance with the present methods, systems and devices. Specifically, the method 600 may be implemented to compensate for the aforementioned effective bias that may be acquired by logical qubits.

The method 600 could be implemented by a series of processor readable instructions stored on a media. Some examples of method 600 are performed in part by a specialized device such as an adiabatic quantum computer or a quantum annealer or a system to program or otherwise control operation of an adiabatic quantum computer or a quantum annealer, for instance a computer that includes at least one digital processor. The method 600 includes various acts, though those of skill in the art will appreciate that in alternative examples certain acts may be omitted and/or additional acts may be added. Those of skill in the art will appreciate that the illustrated order of the acts is shown for exemplary purposes only and may change in alternative examples.

The method 600 starts at 602, for example in response to a call or other invocation from another routine.

At 604, the computational system receives a request to detect and correct errors.

At 606, the processor-based device sets all of the local bias terms ($h_i$) to a calibrated zero value and all of the intra-logical qubit coupling terms ($J_{ij}$) to a target value relative to a calibrated zero value. In some implementations the intended target value is non-zero. The intra-logical qubit couplers may be set to a coupling strength sufficient to form logical qubits each comprising multiple qubits. The processor-based device also sets all of the inter-logical qubit coupling terms to zero.

At 608, the computational system generates or causes generation of samples from the quantum processor and/or receives samples from the quantum processor. Generating samples is described above with reference to act 408 of method 400 (FIG. 4) and are not repeated here for brevity.

At 610, the processor-based device constructs an estimate of the population of every logical qubit in the working graph of the quantum processor, and at 612 determines whether each logical qubit exhibits a bias toward a basis state (e.g., a bias toward +1 or −1). At 614, for each qubit in a set or chain of qubits forming a logical qubit which is determined to exhibit a bias, the processor-based device adjusts the local bias term ($h_i$). This process may be executed iteratively until none of the logical qubits of the quantum processor exhibit a bias, or at least until some termination criteria is met (e.g., a calibration time is exceeded, a number N of calibration iterations is reached, or a maximum bias threshold is met). With the correction in place, the processor-based device may then submit the requested problem to be solved to the quantum processor.

In some implementations, the following acts are used to implement the method 600. First, the processor-based device sets a bias adjustment value to some small amount (e.g., 0.3). The processor-based device may then sample solutions to the problem using the quantum processor with only the intra-logical couplers having non-zero values. If the logical qubit is biased in one direction or the other, the processor-based device may modify the local bias ($h_i$) on each qubit forming the logical qubit by the bias adjustment value. The processor-based device may repeat these acts for each logical qubit in the quantum process. The processor-based device may then reduce the value for the bias adjustment value (e.g., by half), and repeat the above acts for a number (e.g., seven) of iterations. The final local biases $h_i$ may then be applied to the original problem to be solved using the quantum processor.

Figure 8:
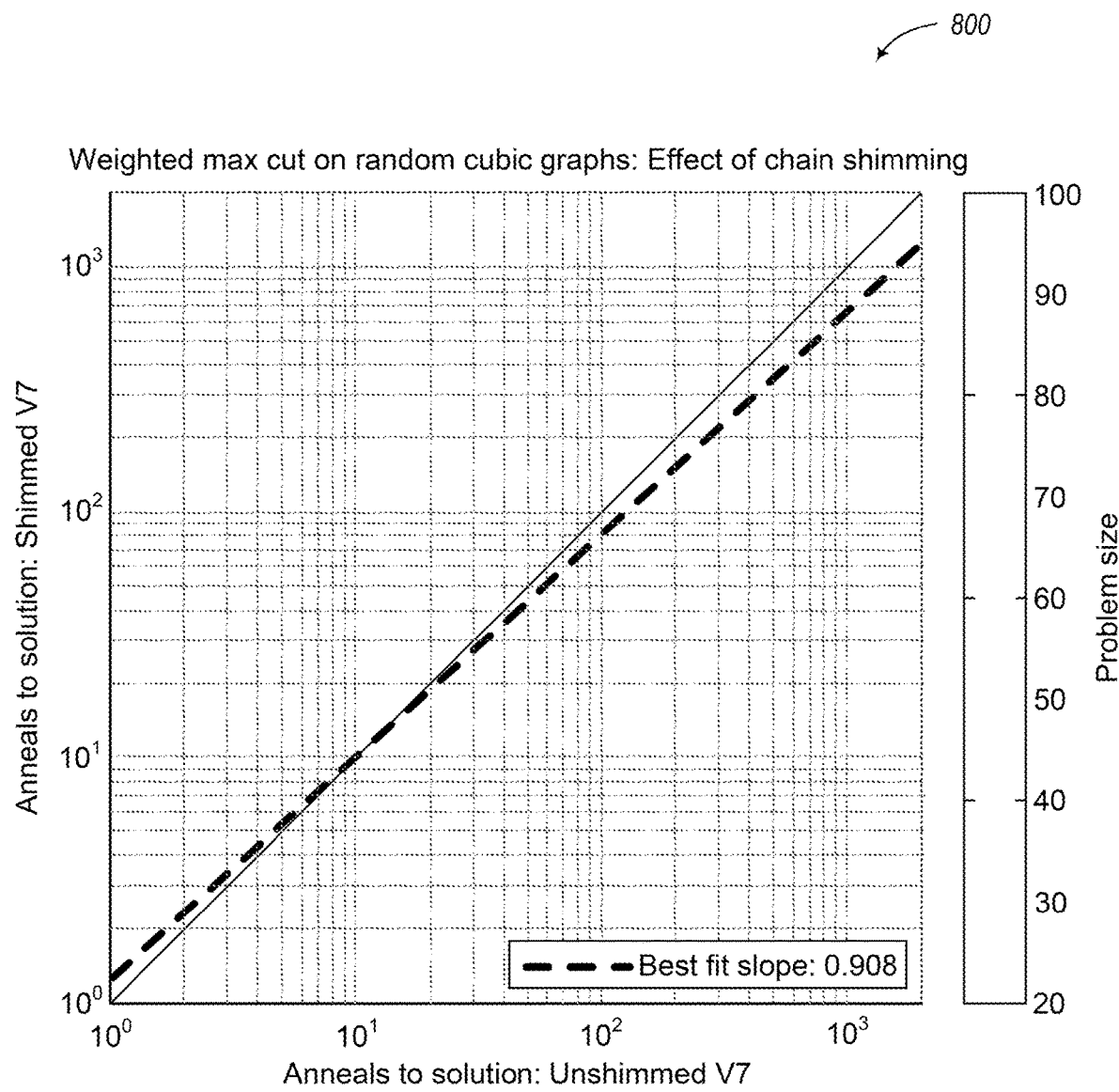
FIG. 8 is a graph of performance data on weighted MAX-CUT instances with and without correction provided by the method illustrated by the flow diagram of FIG. 6, in accordance with the presently described systems, devices, articles, and methods.

FIG. 8 illustrates a graph 800 of performance data on weighted MAX-CUT instances with and without the correction provided by the method 600. Graph 800 shows a line of best fit to the performance data, the line of best fit drawn as a dashed line. As can be seen, the method 600 provides a performance improvement for at least the largest problem sizes.

The method 600 ends at 616 until started again. For example, the method 600 may be called or otherwise invoked when it is beneficial to obtain updated or "on-the-fly" calibration parameters for the quantum processor. Advantageously, the method 600 may be executed after the quantum processor has been operated for an extended period of time, during which drifts or other errors may have otherwise degraded the performance of the quantum processor.

Figure 9:
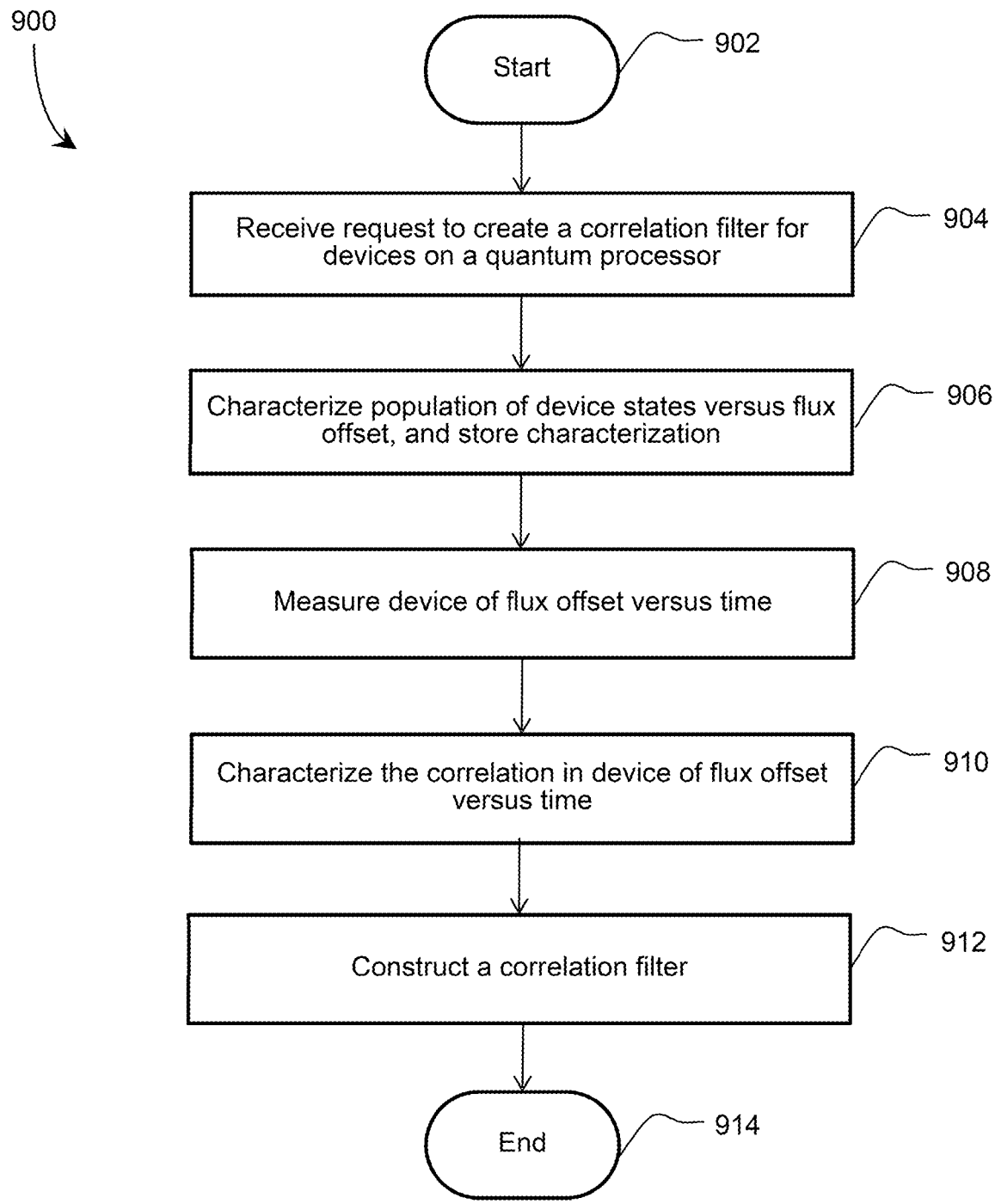
FIG. 9 is a flow diagram showing a method of calibration correction for parameters associated with one or more devices on a quantum processor, in accordance with the presently described systems, devices, articles, and methods.

FIG. 9 shows a method 900 of calibration correction for parameters associated with one or more devices on a quantum processor. Execution of the method 900 by one or more processor-based devices constructs a correlation filter for later use to increase the performance of a quantum processor in accordance with the present system, devices, articles, and methods. Method 900, like other methods herein, for example methods 400, 500, et seq. may be implemented by a series or set of processor-readable instructions excuted by one or more processors (i.e., hardware circuitry). Method 900 may be implemented on devices described herein. Variations described in relation to other methods herein may apply to method 900.

The method 900 starts at 902, for example in response to a call from another routine or other invocation.

At 904, the computational system receives a request to construct a correlation filter. The computational system may also receive information specifying the quantum processor, for example, indices to the various devices on the quantum processor.

Method 900 comprises a calibration procedure performed prior to running problems on the quantum processor, and includes the construction of a correlation filter. Method 900 is typically performed only once before running a number of problems on the quantum processor.

At 906, the computational system characterizes device states as a function of device control parameters (for example, flux offsets). In some implementations, characterization of the computational system includes solving a zero problem on the quantum processor. The zero problem includes initializing, evolving, and readout of qubit states when the local bias values and the coupling values are set to their intended zero value.

Through repeated measurements, the computational system can populate a data structure that characterizes device state versus parameter values. For example, for superconducting flux qubit with two basis states, the computational system can record the number of times the qubit is found in a basis state for a given flux offset.

In some implementations, the relationship between population and control parameter offset is encoded in a model. In some examples, the model is a determined by the underlying statistical distribution for the devices on the quantum processor. For the example, in the case of superconducting flux qubits, the statistical distribution can be a Boltzmann distribution.

An example of a model based on the Boltzmann distribution is a hyperbolic tangent function describing the probability that a computational state is occupied for a given flux offset. For a superconducting flux qubit where the parameter is local flux bias, a suitable model is as follows:

$$2P_+ - 1 = \tan h(\alpha z \Phi_q^x) \tag{37}$$

That is, the probability of being in the "up" state is correlated with a hyperbolic tangent of the flux applied to the qubit q. Here a is a fit parameter proportional to qubit persistent current $I_P$ divided by $k_B T$, T is temperature, and $k_B$ is the Boltzmann constant. The model described by equation (37) can be used to convert measurements of qubit probability $P_+$ to flux offsets $\Phi_q^x$.

At 908, the computational system performs a series of measurements to characterize the time correlations inherent in the devices included in the quantum processor. For example, the computational system causes the system to perform a long time-series measurement of a device parameter. In some implementations, the time series tracks the qubit flux offset versus time i.e. tracks how the flux offset varies drifts over time. The time-series can be used to compute correlations in the data.

In some implementations, a series of qubit flux offset measurements are performed. The measurements can be made by first measuring the qubit probabilities, and then converting the qubit probabilities to flux offsets using a model such as the model described in equation (37).

The flux offset $\Phi_q(t)$ for each qubit, q, as a function of time is recorded. If the time interval between measurements is fixed and m measurements are made then the correlation function is a matter of the m measurements for different overlaps:

$$f(n\tau) = \langle \Phi_q(m\tau + n\tau) / \Phi_q(m\tau + \tau) \rangle \tag{38}$$

where the angled brackets are an average over all the m measurements and n is an integer and τ is the time interval between measurements. Points for which the denominator is close to zero can be excluded from the average.

A continuous correlation function can be computed from the discrete correlation function in equation (38). By fitting the following equation to the data defined by equation (38), a continuous correlation function can be found:

$$f(t)=a+bt^{-c} \qquad (39)$$

where a, b, and c are fit parameters. Typically, in superconducting flux qubits, c is about unity. In some implementations, the fit to equation (39) can be modified to clamp c to a value of unity.

At 912, the computational system constructs a correlation filter. For each device at a given time, an offset correction can be provided by the filter, as follows:

$$\Delta\Phi_q(t)=\Phi_q(t_0)f(t-t_0) \qquad (40)$$

where $\Delta\Phi_q$ (t) is the correction to the parameter offset for qubit q at time t. Time $t_0$ is the time of the previous full measurement.

As the time difference $(t-t_0)$ increases, the correlations decay and the correlation filter's ability to provide an accurate correction decline.

The method 900 ends at 914, until invoked again, for example, a request to re-preform the calibration. In some implementations, method 900 is performed once before problems are run on the quantum processor. In other implementations, method 900 can be repeated at one or more suitable intervals.

Figure 10:
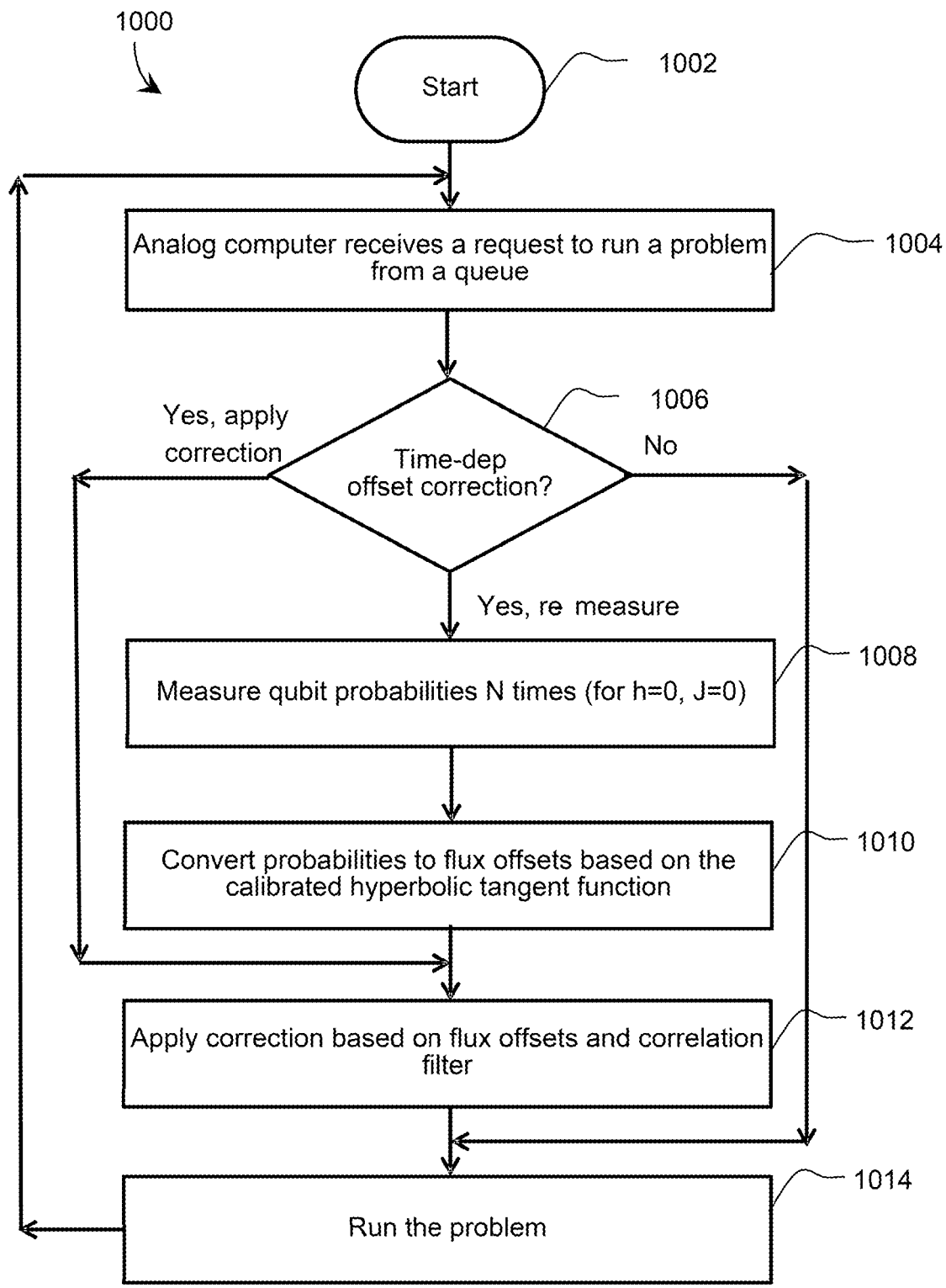
FIG. 10 is a flow diagram showing a method of operating a quantum processor while correcting one or more parameters on one or more devices, in accordance with the presently described systems, devices, articles, and methods.

FIG. 10 shows a method 1000 of operating a quantum processor while correcting one or more parameters on one or more devices. Method 1000 applies a correction to the parameter offset, and includes the use of a correlation filter (such as the correlation filter constructed in method 900), to increase the performance of a quantum processor in accordance with the present system, devices, articles, and methods.

Method 1000, like other methods herein, for example methods 400, 500, et seq. may be implemented by a series or set of processor-readable instructions. Method 1000 may be implemented on devices described herein. Variations described in relation to other methods herein may apply to method 1000.

The method 1000 starts at 1002, for example in response to a call from another routine or other invocation.

At 1004, the computational system, which includes an analog computer, receives and processes a request to run a problem from a queue. The queue, a first in first out (FIFO) data structure, stores the problem Hamiltonians and other related information for the computational system to perform an initialization, evolution and read out cycle using a quantum processor.

At 1006, the computational system tests to determine if a time-dependent offset correction is needed. The determination can be based on elapsed time, the number of problems taken from the queue and processed, or another suitable criterion. If the computational system determines that no time-dependent offset correction is needed, method 1000 proceeds to 1014 where the computational system runs the problem and returns control to 1004.

If the computational system determines at 1006 that a time-dependent offset correction including a re-measurement is needed, then control proceeds to 1008. At 1008, the computational system measures the qubit probabilities a number of times for a given set of local bias and coupler values. In some implementations the measurements are made for a "zero problem" i.e. a problem with the local bias values set to zero and the coupler values also set to zero.

At 1010, the computational system converts the qubit probabilities to flux offsets using the characterization determined by method 900, e.g. the calibrated hyperbolic function.

At 1012, the computational system applies a correction based on the flux offsets and the correlation filter determined by method 900.

At 1014, method 1000 runs the problem and returns control to 1004.

If the computational system determines at 1006 that a time-dependent offset without re-measurement is needed, then the control proceeds to 1012. At 1012, the computational system applies a correction based on the flux offsets and the correlation filter determined by method 900. At 1014, method 1000 runs the problem and returns control to 1004.

In practice, the re-measurement frequency is less than the correction frequency. For example, the computational system may be configured to perform a re-measurement once every 10 s, whereas the computational system may be configured to perform a correction every 1 s. The frequency at which re-measurements are made is selected based, at least in part, on a trade-off between accuracy and performance.

The systems, methods, and articles described herein may be extended further than individual qubits, logical qubits, or couplers. For example, systems of coupled logical qubits may acquire a small bias that may be corrected using a method similar to those discussed above.

The above described method(s), process(es), or technique(s) could be implemented by a series of processor readable instructions stored on one or more nontransitory processor-readable media. Some examples of the above described method(s), process(es), or technique(s) method are performed in part by a specialized device such as an adiabatic quantum computer or a quantum annealer or a system to program or otherwise control operation of an adiabatic quantum computer or a quantum annealer, for instance a computer that includes at least one digital processor. The above described method(s), process(es), or technique(s) may include various acts, though those of skill in the art will appreciate that in alternative examples certain acts may be omitted and/or additional acts may be added. Those of skill in the art will appreciate that the illustrated order of the acts is shown for exemplary purposes only and may change in alternative examples. Some of the exemplary acts or operations of the above described method(s), process(es), or technique(s) are performed iteratively. Some acts of the above described method(s), process(es), or technique(s) can be performed during each iteration, after a plurality of iterations, or at the end of all the iterations.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other methods of quantum computation, not necessarily the exemplary methods for quantum computation generally described above.

The various embodiments described above can be combined to provide further embodiments. All of the commonly assigned U.S. patent application publications, U.S. patent applications, foreign patents, and foreign patent applications referred to in this specification and/or listed in the Application Data Sheet, including but not limited to commonly assigned:

U.S. patent application Ser. No. 14/173,101, filed Feb. 5, 2014, now patent application publication no., 2014-0223224;

International patent application Serial No. PCT/US2014/014836, filed Feb. 5, 2014, now WIPO publication number WO2014123980;

U.S. patent application Ser. No. 14/339,289, filed Jul. 23, 2014, now US Patent Application Publication 2015-0032993;

U.S. patent application Ser. No. 14/340,303, filed Jul. 24, 2014, now patent application publication no., 2015-0032994;

U.S. provisional patent application Ser. No. 61/858,011, filed Jul. 24, 2013;

U.S. provisional patent application Ser. No. 62/040,643, filed Aug. 22, 2014, titled: SYSTEMS AND METHODS FOR PROBLEM SOLVING VIA SOLVERS EMPLOYING PROBLEM MODIFICATION;

U.S. provisional patent application Ser. No. 62/040,646, filed Aug. 22, 2014, titled: SYSTEMS AND METHODS FOR PROBLEM SOLVING VIA SOLVERS EMPLOYING POST-PROCESSING THAT OVERLAPS WITH PROCESSING;

U.S. provisional patent application Ser. No. 62/040,661, filed Aug. 22, 2014, titled: SYSTEMS AND METHODS FOR PROBLEM SOLVING VIA SOLVERS EMPLOYING SELECTION OF HEURISTIC OPTIMIZER(S); and U.S. provisional patent application Ser. No. 62/040,890, filed Aug. 22, 2014, titled: SYSTEMS AND METHODS FOR IMPROVING THE PERFORMANCE OF A QUANTUM PROCESSOR BY CORRECTING TO REDUCE INTRINSIC/CONTROL ERRORS; and U.S. provisional patent application Ser. No. 62/048,043, filed Sep. 9, 2014, titled: SYSTEMS AND METHODS FOR IMPROVING THE PERFORMANCE OF A QUANTUM PROCESSOR VIA REDUCED READOUTS, each of which is incorporated herein by reference, in their entirety. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of operation for a computational system, the computational system including at least one quantum processor which comprises a plurality of physical qubits, each of the plurality of physical qubits having a respective controllable local bias term, and a plurality of physical qubit couplers, each of the physical qubit couplers coupling a respective set or group of the physical qubits, each of the plurality of physical qubit couplers having a respective controllable coupling term, wherein a first number of the physical qubit couplers are operated as intra-logical qubit couplers where each of the first number of the physical qubit couplers have a respective coupling strength that couples a respective set of the physical qubits as a logical qubit, where each logical qubit represents a variable from a problem, and a second number of the physical qubit couplers are operated as inter-logical qubit couplers, wherein each of the second number of the physical qubit couplers have a respective coupling strength that controllably couples a respective group of the physical qubits, where the physical qubits in the respective group are part of different ones of the logical qubits and wherein at least two variables from the problem are assigned to two respective logical qubits, the computational system further including at least one processor-based device communicatively coupled to configure the at least one quantum processor, the method comprising:

causing the at least one quantum processor to set each of the coupling terms of respective intra-logical qubit couplers to a value that provides a coupling strength that couples a respective set of the physical qubits as a logical qubit;

causing the at least one quantum processor to set each of the coupling terms of the inter-logical qubit couplers to a first calibrated zero value;

causing the at least one quantum processor to set each of the local bias terms to a second calibrated zero value; and calibrating the local bias terms for the qubits by, for each logical qubit,
setting a bias adjustment value to a first amount, the first amount small with respect to a basis state;
obtaining a number of samples via the at least one quantum processor;
constructing an estimate of a population for the logical qubit using the obtained number of samples;
determining whether the logical qubit exhibits a bias toward a basis state; and
modifying the local bias term of at least one qubit forming the logical qubit by the bias adjustment value upon determination that the logical qubit exhibits a bias toward a basis state to remove the bias;

causing the at least one quantum processor to evolve from an initial state to a final state based on an input problem and, in the course of evolving, to bias one or more of the plurality of qubits based on one or more corresponding updated local bias terms.

2. The method of claim 1 wherein each of the physical qubit couplers coupling a respective set or group of the physical qubits is a physical qubit coupler coupling a respective pair of the physical qubits.

3. The method of claim 2, further comprising:
iteratively calibrating the local bias terms until one or more criteria are met.

4. The method of claim 3 wherein, for successive calibration iterations, the method comprises:
modifying the local bias term of each of the qubits forming the logical qubit by a bias adjustment value less than a bias adjustment value used on a previous calibration iteration.

5. The method of claim 3 wherein iteratively calibrating the local bias terms until one or more criteria are met comprises iteratively calibrating the local bias terms until one or more of the following criteria are met: an elapsed calibration time, a number of calibration iterations, or a bias threshold.

6. The method of claim 2 wherein each of the plurality of qubits is superconducting below a critical temperature, the method further comprising:
   maintaining the plurality of qubits at or below the critical temperature, the at least one processor-based device:
   initializing the at least one quantum processor in a first configuration embodying an initialization Hamiltonian; and
   evolving the quantum processor until the quantum system is described by a second configuration embodying a problem Hamiltonian.

7. The method of claim 2, further comprising:
   repeatedly initializing and evolving the at least one quantum processor for at least N iterations, where N >1; and
   repeatedly calibrating the local bias terms after at least one of the initialization and evolution iterations while the plurality of qubits are maintained at an operating temperature.

8. The method of claim 2 wherein calibrating the local bias terms comprises calibrating the local bias terms after the plurality of qubits have had sufficient time to thermalize and arrive at a base temperature.

* * * * *